US006587603B1

(12) United States Patent
Sakurai et al.

(10) Patent No.: US 6,587,603 B1
(45) Date of Patent: Jul. 1, 2003

(54) SENSOR UNIT CAPABLE OF OUTPUTTING IMAGE SIGNALS BY BLOCKS AND PROCESSING CIRCUIT WHICH PROCESSES IMAGE SIGNALS BY BLOCKS

(75) Inventors: Katsuhito Sakurai, Machida (JP); Shigetoshi Sugawa, Atsugi (JP); Isamu Ueno, Hadano (JP); Katsuhisa Ogawa, Machida (JP); Toru Koizumi, Yokohama (JP); Tetsunobu Kochi, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/347,262

(22) Filed: Jul. 6, 1999

(30) Foreign Application Priority Data

Jul. 6, 1998 (JP) ............................................ 10-205900
Jul. 30, 1998 (JP) ............................................ 10-215693

(51) Int. Cl.$^7$ ............................. G06K 7/00; G06K 9/36; H04N 5/228; H04N 9/083
(52) U.S. Cl. .................... 382/312; 382/166; 348/222.1; 348/272
(58) Field of Search ................................ 382/166, 312, 382/324, 232, 239, 253; 375/240.12, 240.16, 240.24; 348/279, 272, 223, 222.1; 250/208.1

(56) References Cited

U.S. PATENT DOCUMENTS

| | | | | |
|---|---|---|---|---|
| 4,903,124 A | * | 2/1990 | Hoshi et al. | 375/240.22 |
| 4,972,243 A | | 11/1990 | Sugawa et al. | 357/30 |
| 5,089,884 A | * | 2/1992 | Suzuki et al. | 358/539 |
| 5,162,912 A | | 11/1992 | Ueno et al. | 358/213.16 |
| 5,508,742 A | * | 4/1996 | Geerlings et al. | 348/279 |
| 5,764,807 A | * | 6/1998 | Pearlman et al. | 382/240 |

OTHER PUBLICATIONS

PASIC: A processor–A/D converter–Sensor Integrated Circuit, Chen, K. et al., IEEE International Symposium on Circuits and Systems, 1990, vol. 3, pp. 1705–1708.*

\* cited by examiner

*Primary Examiner*—Wenfeng Chen
(74) *Attorney, Agent, or Firm*—Fitzpatrick, Cella, Harper & Scinto

(57) ABSTRACT

Control to read signals from a sensor unit having a plurality of pixels by pixel blocks of a predetermined size, and the read signals are applied an operation to acquire distinctive information by pixel blocks of the predetermined size. The calculated distinctive information is applied to signal processes, such as signal compression, performed by a block.

18 Claims, 23 Drawing Sheets

| Ye | Mg |
|----|-----|
| Cy | G |

—3

| Ye | Cy |
|----|----|
| Mg | G |
| Ye | Cy |
| G | Mg |

| Ye+Mg | Cy+G |
|-------|------|
| Ye+G | Cy+Mg |

—3

| R | G |
|---|---|
| G | B |

—3

SENSOR UNIT CAPABLE OF OUTPUTTING IMAGE SIGNALS BY BLOCKS AND PROCESSING CIRCUIT WHICH PROCESSES IMAGE SIGNALS BY BLOCKS

BACKGROUND OF THE INVENTION

The present invention relates to an image sensing device, image signal processing method, an image sensing system, an image sensing apparatus, and a storage medium storing computer readable program codes of the method.

In an image signal processing circuit which deals with color signals, a variety of image signal processes, including compression, are usually performed. Generally, in the image signal processes, signals are processed by pixel blocks of a predetermined size.

There are various kinds of image signal processes which are performed by pixel blocks of the predetermined size, and code book information compression and expansion processes performed by comparing a pattern of pixel signals outputted from an image sensing device to codes stored as a code book, for instance, are included in such image signal processes.

In code book information compression and expansion processes, it is possible to improve precision of pattern (code) searching and processing speed by calculating, e.g., a maximum value, a minimum value, a difference between the maximum and minimum values, and addresses/address of pixels/pixel with the maximum and/or minimum value in each pixel block in advance of performing the pattern searching, and using these calculated values in the pattern searching.

When performing the calculation as described above, conventionally, pixel signals outputted from an image sensing device are processed by a signal processing circuit provided subsequently to the image sensing device. Therefore, in order to start processing the signals by pixel blocks, the signal processing circuit has to wait until all the pixel signals configuring each block are outputted from the image sensing device.

Further, memory is necessary for calculating a maximum value, a minimum value, a difference between the maximum and minimum values, addresses/address of pixels/pixel with the maximum and/or minimum value in each pixel block, and the required memory capacity is considerably large.

Therefore, neither good cost performance nor the high-speed image signal processing can be expected when a variety of image signal processes are to be performed in the conventional signal processing circuit.

SUMMARY OF THE INVENTION

The present invention has been made in consideration of the above situation, and has as its object to provide an image sensing device capable of outputting image signals suitable for image signal processes.

According to the present invention, the foregoing object is attained by providing an image sensing device comprising: a sensor unit having a plurality of pixels; control means for controlling to read signals from the sensor unit by pixel blocks of a first predetermined size; and signal processing means for calculating an address of a pixel with a distinctive value for each pixel block of the first predetermined size.

Further, the foregoing object is also attained by providing an image sensing device comprising: a sensor unit having a plurality of pixels; control means for controlling to read signals from the sensor unit by pixel blocks of a predetermined size; and signal processing means for calculating a difference between a plurality of distinctive values for each pixel block of the predetermined size, wherein the plurality of distinctive values are signals of different pixels in each pixel block.

Furthermore, the foregoing object is also attained by providing an image sensing device comprising: a sensor unit having a plurality of pixels; control means for controlling to read signals from the sensor unit by pixel blocks of a first predetermined size; and signal processing means for calculating distinctive information and performing operation between the distinctive information and each pixel in each pixel block of the first predetermined size.

Further, it is still another object of the present invention to provide an image sensing apparatus and an image sensing system using either of the aforesaid sensor units, an image processing method, and a computer readable storage medium storing program codes of the image processing method.

According to the present invention, the image sensing apparatus includes a sensor unit having a plurality of pixels; control means for controlling to read signals from the sensor unit by pixel blocks of a first predetermined size; signal processing means for calculating distinctive information of the signals, read from the sensor unit, for each pixel block of the first predetermined size; and compression means for compressing the read signals by the blocks of the first predetermined size using the distinctive information calculated by the signal processing means.

According to the present invention, the image processing method comprises a reading step of reading signals of a plurality of pixels by pixel blocks of a first predetermined size; and a signal processing step of calculating an address of a pixel with a distinctive value for each pixel block of the first predetermined size.

Further, the foregoing object is also obtained by providing an image signal reading and processing method comprising: a reading step of reading signals of a plurality of pixels by pixel blocks of a predetermined size; and a signal processing step of calculating a difference between a plurality of distinctive values for each pixel block of the predetermined size, wherein the plurality of distinctive values are signals of different pixels in each pixel block.

Furthermore, the foregoing object is also attained by providing an image signal reading and processing method comprising: a reading step of reading signals of a plurality of pixels by pixel blocks of a first predetermined size; and a signal processing step of calculating distinctive information and performing operation between the distinctive information and each pixel in each pixel block of the first predetermined size.

According to the present invention, the computer readable storage medium includes program codes of the steps of the aforesaid image processing method.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail below in accordance with the accompanying drawings.

First Embodiment

The first embodiment of the present invention is explained below.

Figure 1:
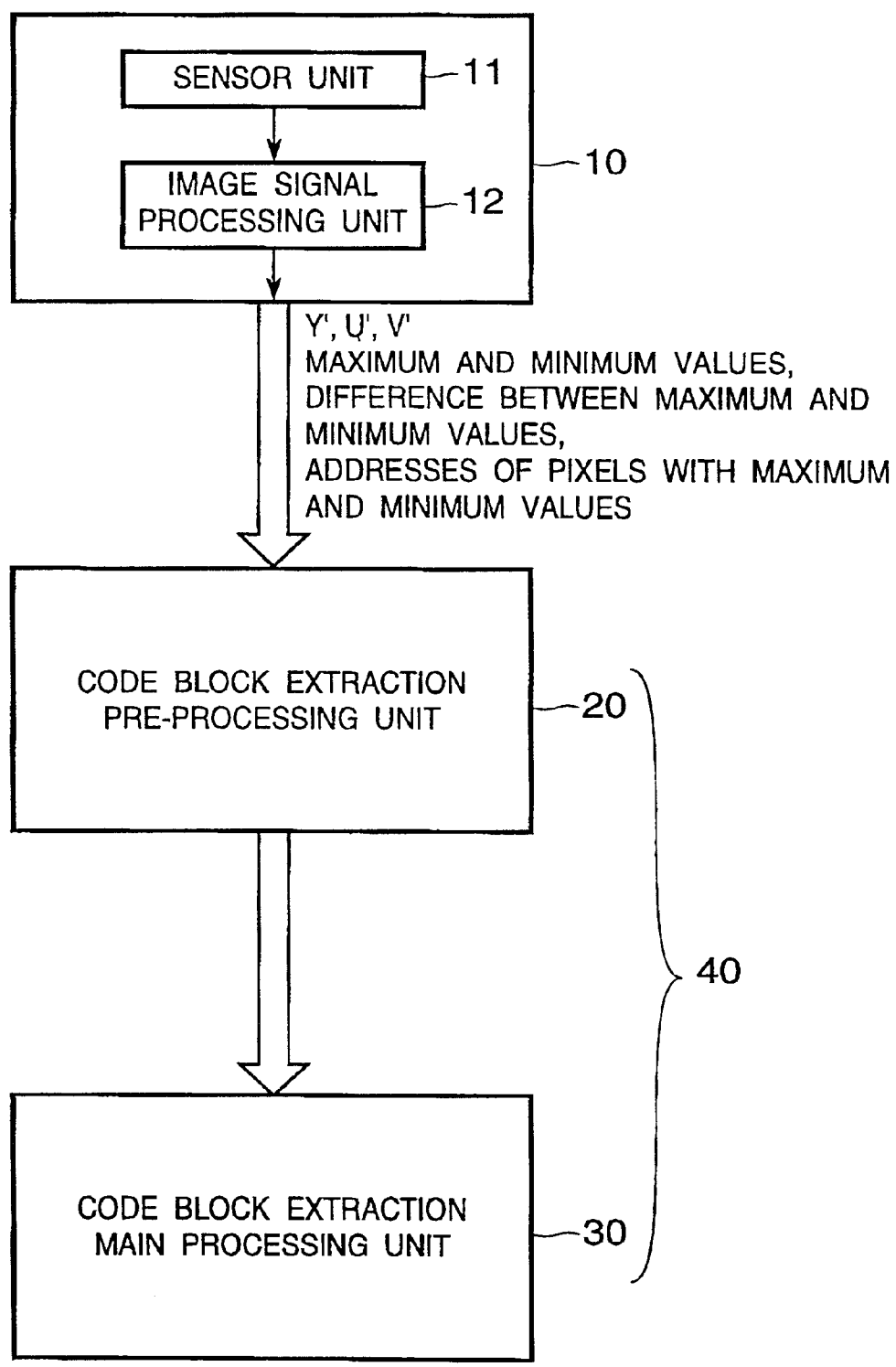
FIG. 1 is a block diagram illustrating a configuration of an image sensing system using an image sensing device of the present invention according to a first embodiment.

FIG. 1 is a block diagram illustrating a configuration of an image sensing system according to the first embodiment. Referring to FIG. 1, the image processing system of the first embodiment includes an image sensing device 10, a code block extraction pre-processing unit 20, and a code block extraction main processing unit 30. The pre-processing unit 20 and the main processing unit 30 configure a code-book-method (vector quantization method) compression unit 40.

The image sensing device 10 comprises a sensor unit 11 and an image signal processing unit 12, both of which are integrally configured on a single IC chip. Image signals outputted from the sensor unit 11 are operated by the image signal processing unit 12, and pseudo luminance and color difference signals (Y', U', and V'), a maximum value, a minimum value, a difference between the maximum value and the minimum value, and addresses of pixels with the maximum and minimum values in each block, whose size is smaller than a frame size, are outputted from the image signal processing unit 12.

Further, complementary color filters of cyan (C), yellow (Y), magenta (M) and green (G) are provided over photodiodes of the respective pixels, and raw (unprocessed) image signals of yellow (Ye), cyan (Cy), magenta (Mg), and green (Gr) are serially outputted from the sensor unit 11.

The image sensing system having the aforesaid configuration of the first embodiment operates as follows. Image signals outputted from the image sensing device 10 enter the code-book-method compression unit 40. The compression unit 40 first compares a pattern represented by the pseudo luminance signals Y' and the pseudo color difference signals U' and V', outputted from the image sensing device 10, of pixels in a pixel block having a size of, e.g., 3×3 pixels or 4×4 pixels which is smaller than a frame size to a plurality of codes (patterns) which are stored in code-book memory in advance, searches for a code-book pattern closest to the pattern of the pixel block, then outputs the code number corresponding to the located closest pattern, thereby completing data compression.

In the first embodiment, the code-book-method compression unit 40 is configured with the code block extraction pre-processing unit 20 and the code block extraction main processing unit 30, as described above.

More specifically, the image signals outputted from the image signal processing unit 12 of the image sensing device 10 are pre-processed by the code block extraction pre-processing unit 20; accordingly, the pattern comparison process is easily performed by the code block extraction main processing unit 30 at high speed.

Figure 2:
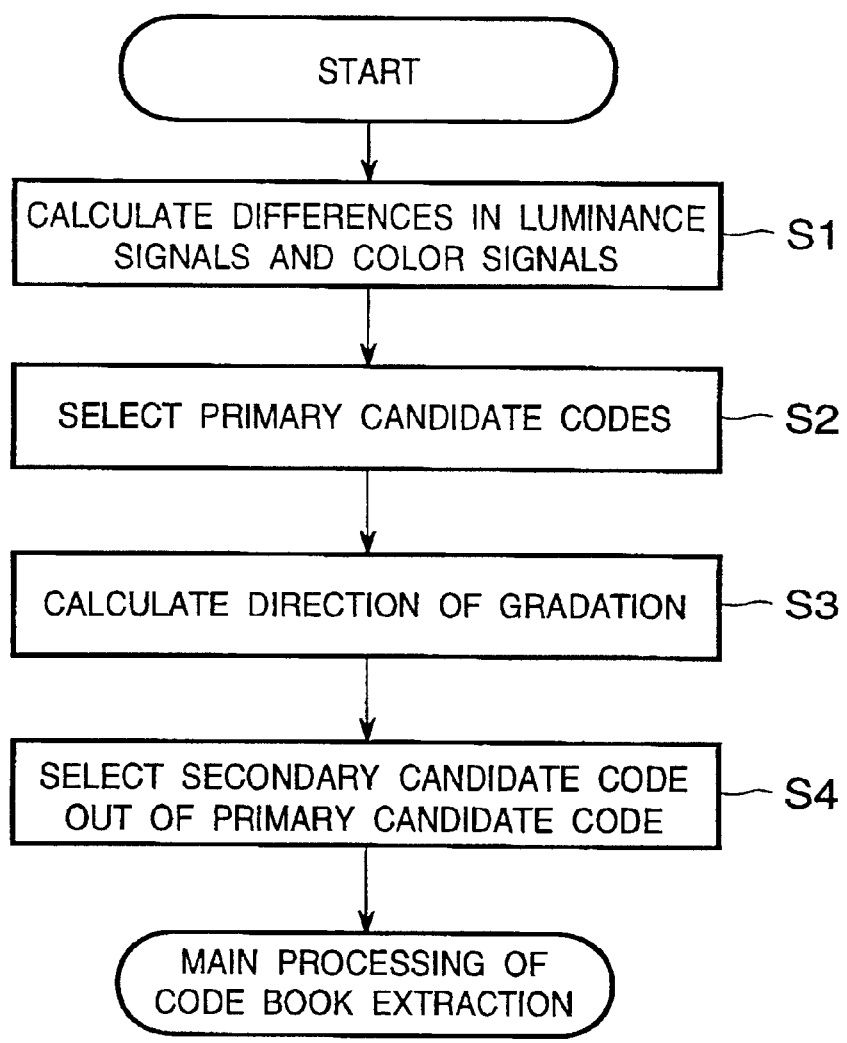
FIG. 2 is a flowchart of a brief operational sequence of signal processes performed in a code block extraction pre-processing unit shown in FIG. 1.

FIG. 2 is a flowchart showing a brief operational sequence of signal processes performed in the code block extraction pre-processing unit 20. As shown in FIG. 2, pseudo luminance signals Y' and pseudo color difference signals U' and V', maximum and minimum values, a difference between the maximum and minimum values, and addresses of pixels with the maximum and minimum values of each block, having a predetermined size which is smaller than a frame size, are inputted to the pre-processing unit 20 from the image sensing device 10, then in step S1, differences in luminance signals and color signals in the block are calculated. Note that the block size is preferably a size by which code book compression is performed in the code-book-method compression apparatus 40.

Next, in step S2, primary candidate codes having differences in luminance signals and color difference signals close to the differences calculated in step S1 are selected from the codes stored in the code book.

Thereafter, in step S3, the direction of gradation of luminance and color differences in the block to be compressed is calculated on the basis of the addresses of pixels with the maximum and minimum values outputted from the image sensing device 10.

Then, in step S4, out of the primary candidate codes selected in step S2, secondary candidate codes having the same gradation direction as the direction calculated in step S3 are selected.

Thus, by performing pre-selection processes for selecting codes whose characteristics are close to those of the block to be compressed out of the code book by the pre-processing unit 20, it is possible to greatly reduce the number of patterns (codes) to be compared to the pattern of the block to be compressed by the main processing unit 30, thereby dramatically improving speed of the comparison processing and precision.

According to the first embodiment of the present invention, it is possible to efficiently perform compression of data which has not been applied with, e.g., white balance correction and y correction by pixel blocks using distinctive data of the respective pixel blocks. It should be noted that, in the first embodiment, all of the distinctive data, i.e., maximum and minimum values, the difference between the maximum and minimum values, and addresses of pixels with the maximum and minimum values, of each block are used in the pre-processing unit 20, however, a part of the data may be used instead. Further, a configuration of the image sensing system can be simplified by providing means for operating the distinctive data of each pixel block on the same chip as the sensor unit, however, the means and the sensor unit may be configured independently.

Next, an example of a configuration of the image signal processing unit 12 for acquiring a maximum and minimum values, a difference between the maximum and minimum values, and addresses of pixels with the maximum and minimum values is explained with reference to FIG. 3.

Figure 3:
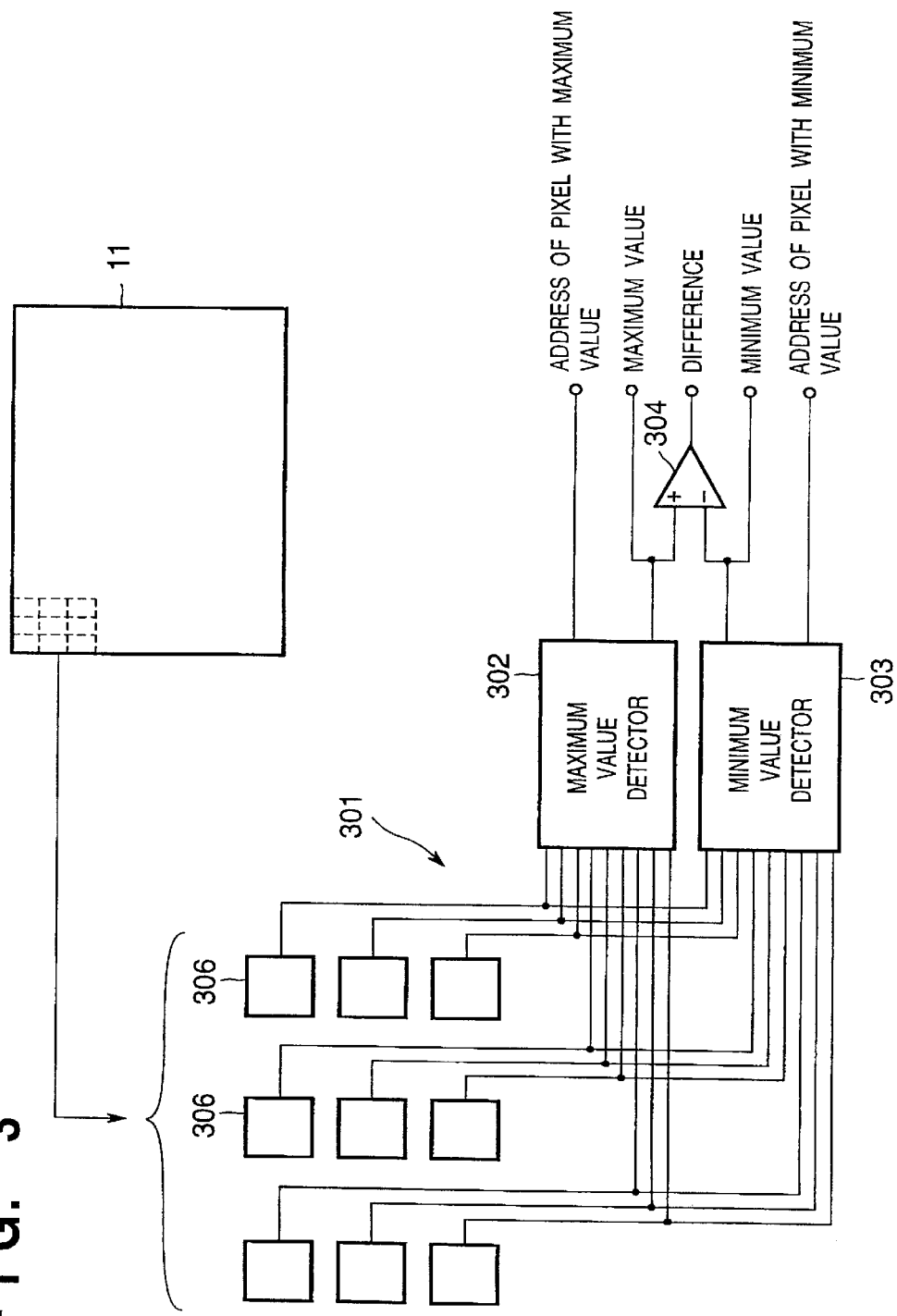
FIG. 3 is a block diagram of a configuration of an image signal processing unit in an image sensing device according to the first embodiment of the present invention.

Referring to FIG. 3, reference numeral 301 denotes memory which includes N (=column×row) analog memory cells 306, each of which stores a signal of each of a plurality of pixels included in a pixel block of a predetermined size (in this case, 3×3 pixel block) read from the sensor unit 11. Then, the N pixel signals stored in the respective analog memory cells are simultaneously outputted to a maximum value detector 302 and a minimum value detector 303. Here, the analog memory cells 306 may be configured as a part of the respective pixels for directly outputting pixel signals of, e.g., a 3×3 pixel block or may be configured as buffer memory on the same chip as the sensor unit.

From the maximum value detector 302, the maximum value and the address of the pixel with the maximum value is outputted, and from the minimum value detector 303, the minimum value and an address of a pixel with the minimum value is outputted.

It should be noted that transference of pixel signals from the sensor unit 11 to the memory cells 306 by blocks may be performed in such a manner that pixel signals of a given 3×3 pixel block are transferred to the memory cells 306 and processed, thereafter, pixel signals of another 3×3 pixel block which is adjoining to the previous block (i.e., centers of these pixel blocks are apart by three pixels) may be read. Alternately, after pixel signals of a given 3×3 pixel block are transferred to the memory cells 306 and processed, pixel signals of another 3×3 pixel block at a position which is shifted by a pixel from the position of the previous pixel block in either horizontal or vertical direction is processed.

Further, the maximum and minimum values are inputted to a differential amplifier 304 from which a difference between the maximum and minimum values is outputted.

Figure 4:
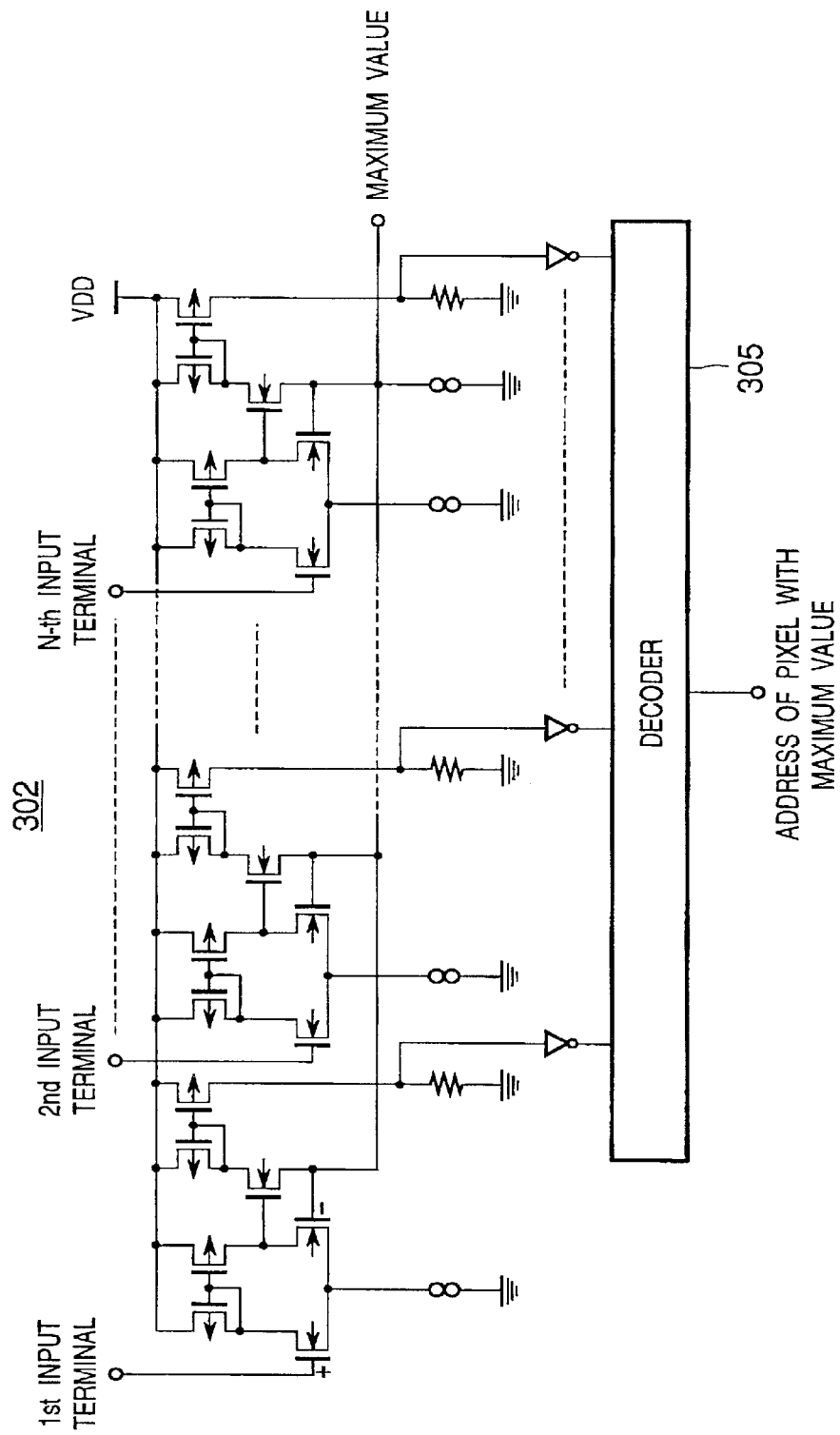
FIG. 4 is a circuit diagram of a configuration of a maximum value detector according to the first embodiment of the present invention.

FIG. 4 is a circuit diagram illustrating a configuration of the maximum value detector 302.

As shown in FIG. 4, first to N-th input terminals are provided in the maximum value detector 302, and signals from the N analog memory cells 306 are inputted through the N input terminals. Then, the maximum value detector 302 outputs a signal having the maximum value out of the inputted N signals.

Further, an inverter, out of N inverters provided for the respective N input terminals, corresponding to the signal having the maximum value is turned to high, and the rest of the inverters remain low. The output from each inverter enters a decoder 305, and an address signal of the signal having the maximum value out of the N inputted signals is outputted.

Figure 5:
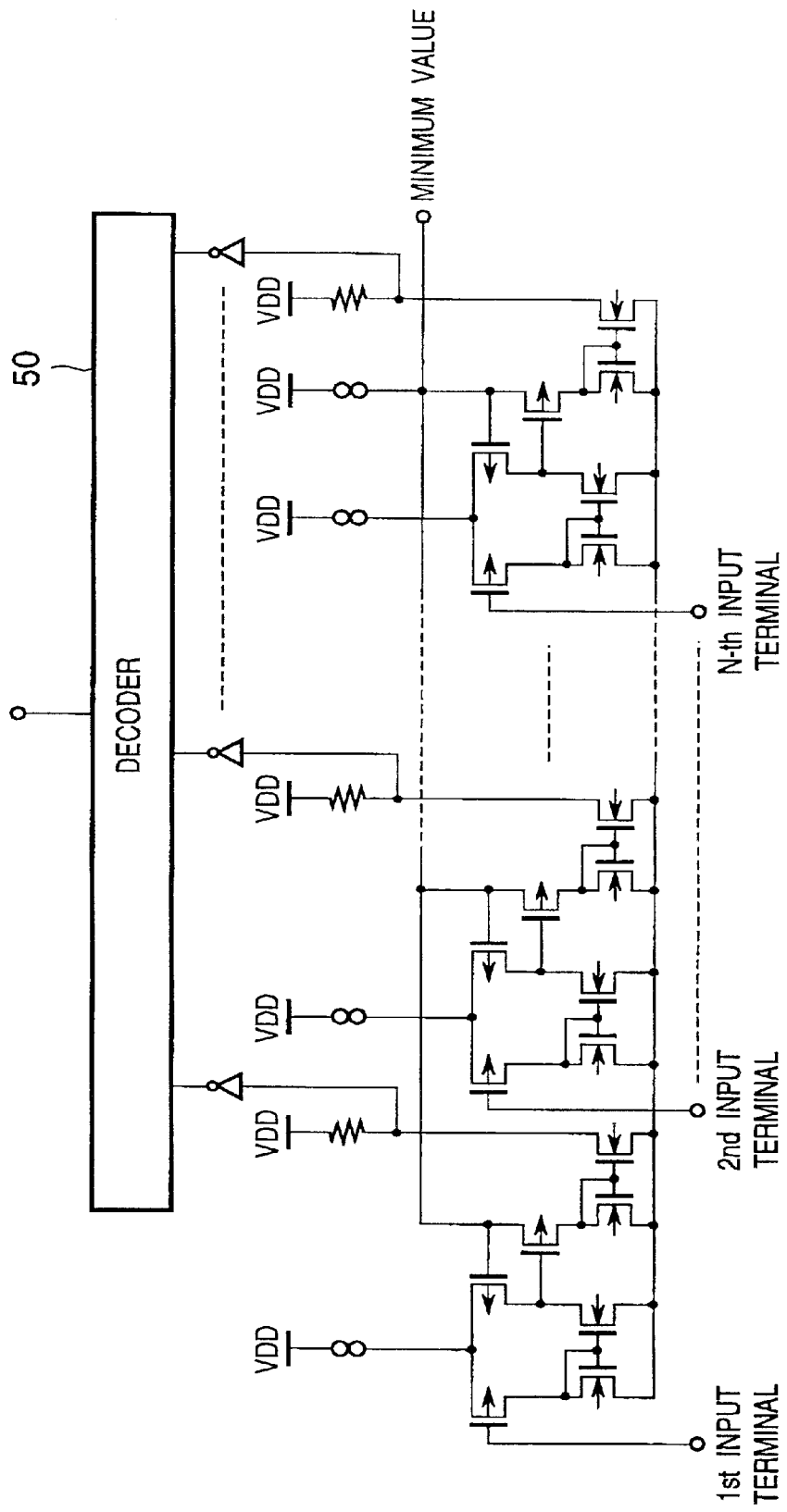
FIG. 5 is a circuit diagram of a configuration of a minimum value detector according to the first embodiment of the present invention.

Next, an example of a circuit configuration of the minimum value detector 303 is explained with reference to FIG. 5. The operation of the minimum value detector 303 is the same as that of the maximum value detector 302 shown in FIG. 4 except that the minimum value is detected instead of the maximum value. From a decoder 50, an address signal of the signal having the minimum value out of the N inputted signals is outputted.

Figure 6:
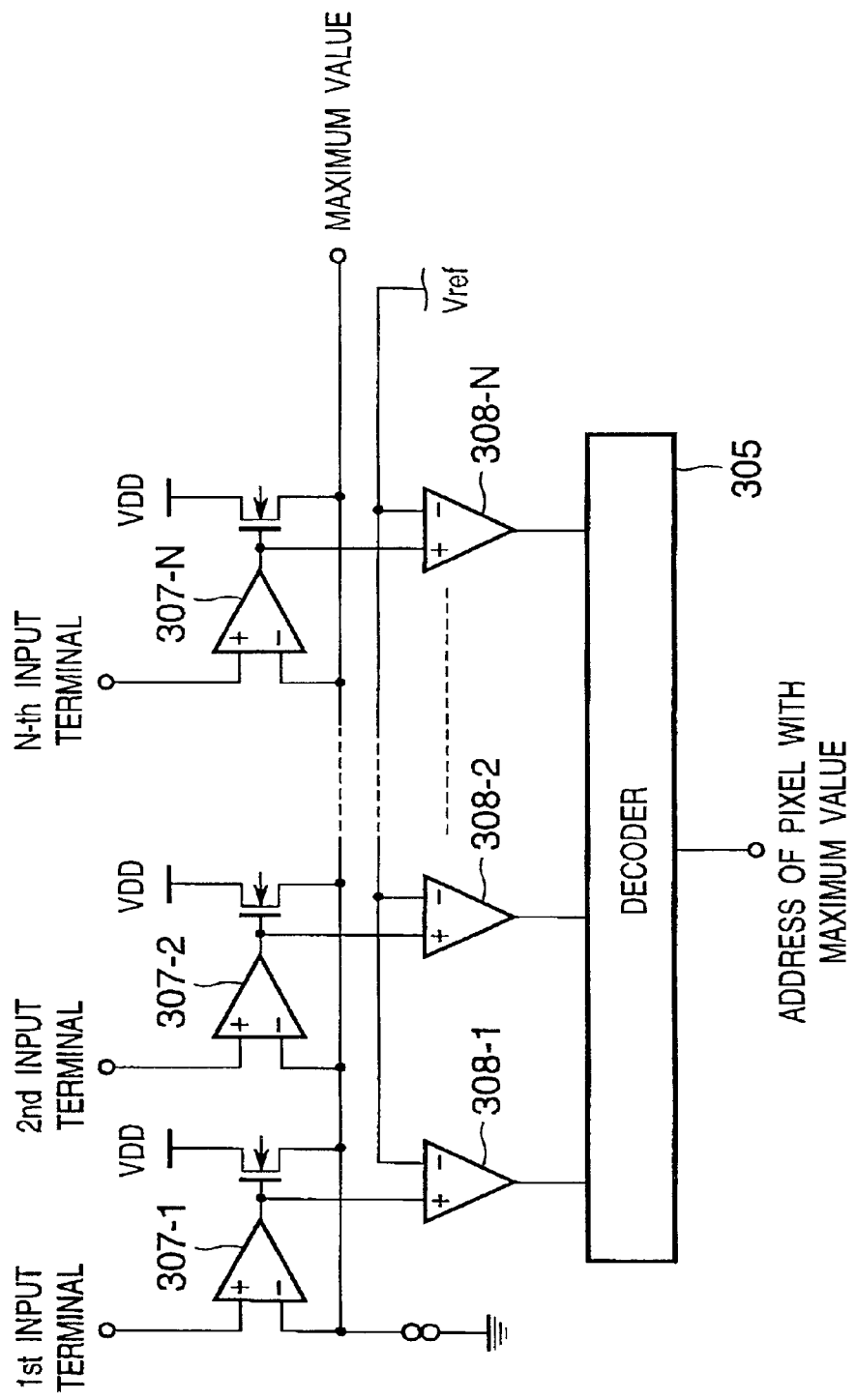
FIG. 6 is a circuit diagram of another configuration of the maximum value detector according to the first embodiment of the present invention.

FIG. 6 is a circuit diagram illustrating another configuration of the maximum value detector 302. The operation of this detector 302 for detecting a maximum value is similar to that of the detector 302 shown in FIG. 4, and among comparators 308-1 to 308-N to which N signals outputted from first to N-th operational amplifiers 307-1 to 307-N are inputted, the one to which a signal having the maximum value is inputted outputs a high signal, and the rest of the comparators output about 0 volt. By optimizing a reference voltage Vref between the maximum value and the 0 volt, only one comparator to which the maximum value is inputted outputs a high signal.

Thereafter, the outputs from the comparator 308-1 to 308-N are inputted to the decoder 305. The decoder 305 detects the address of a pixel corresponding to the comparator which outputted the high signal, and outputs the address signal of the pixel with the maximum value.

Figure 7:
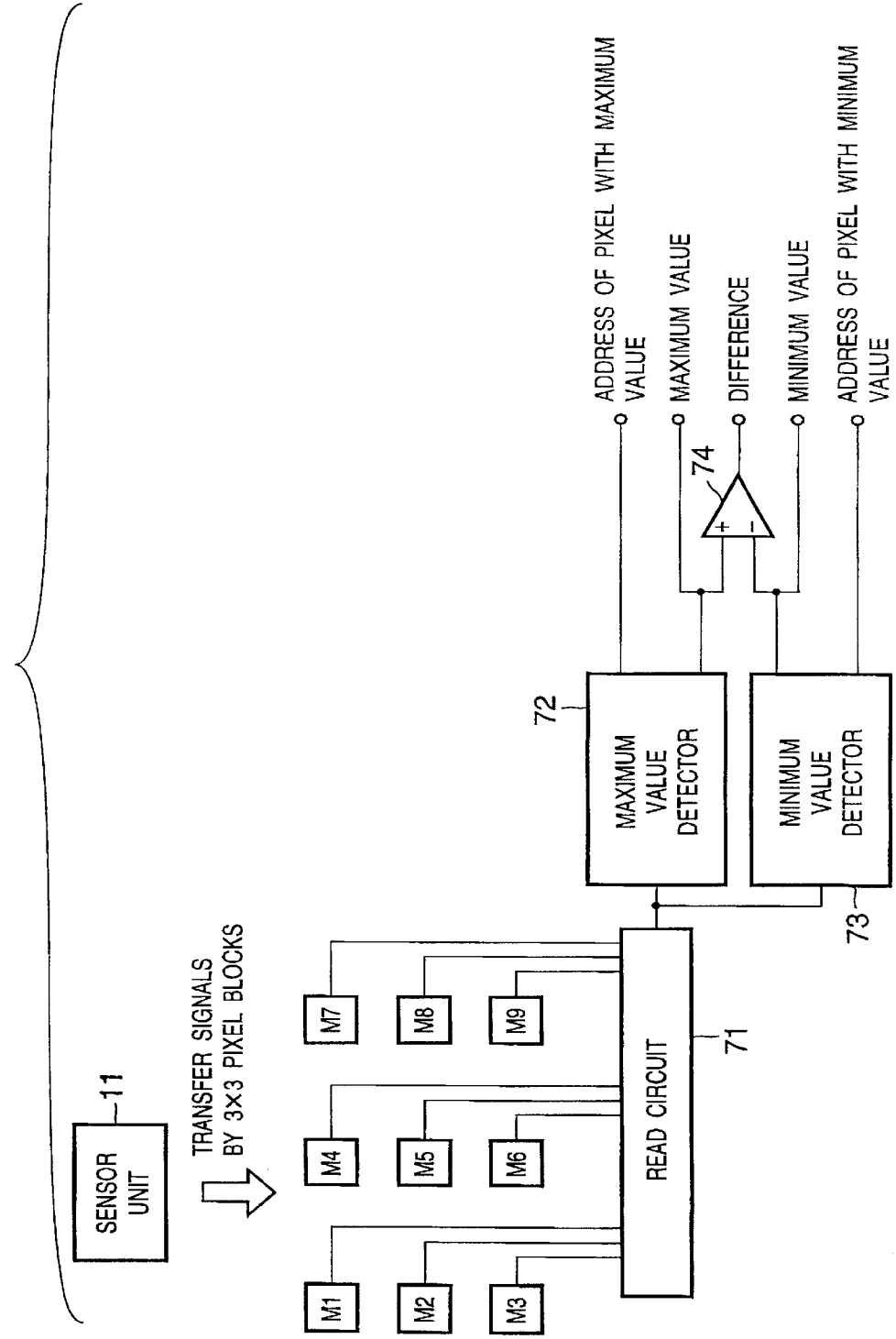
FIG. 7 is a block diagram of another configuration of the image signal processing unit in the image sensing device according to the first embodiment of the present invention.

FIG. 7 is a block diagram illustrating another configuration of the image signal processing unit 12 according to the first embodiment of the present invention.

As shown in FIG. 7, N (=column×row) analog memory cells M1 to M9 are provided, and the analog memory cells M1 to M9 store respectively signals a plurality of pixels included in a pixel block, similarly to those shown in FIG. 3.

Signals from these analog memory cells M1 to M9 are serially outputted through a read circuit 71, and enter a maximum value detector 72 and a minimum value detector 73.

From the maximum value detector 72, the maximum value and an address of one of the analog memory cells M1 to M9 which outputted the maximum value are outputted. Further, from the minimum value detector 73, the minimum value and an address of one of the analog memory cells M1 to M9 which outputted the minimum value are outputted. Furthermore, the maximum and minimum values are inputted to a differential amplifier 74, from which a difference between the maximum and minimum values is outputted as a difference signal.

Figure 8:
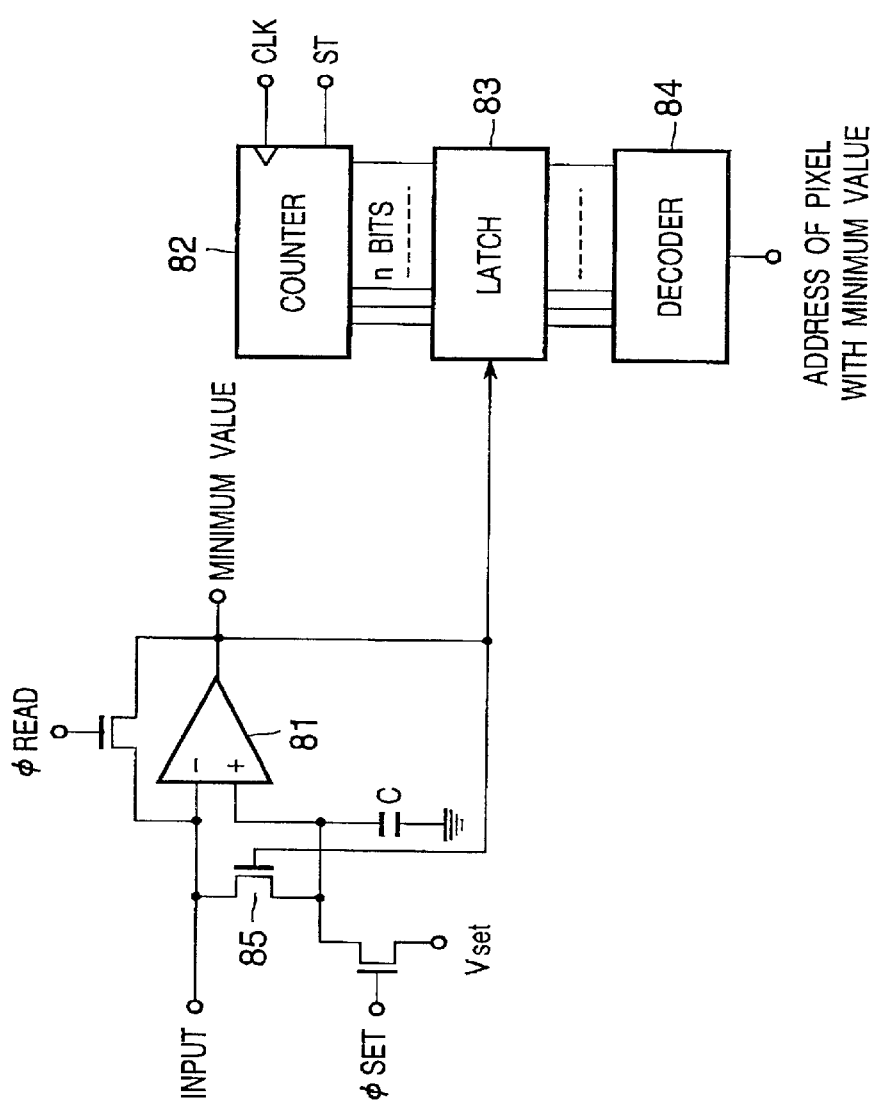
FIG. 8 is a diagram of another configuration of the minimum value detector according to the first embodiment of the present invention.
Figure 9:
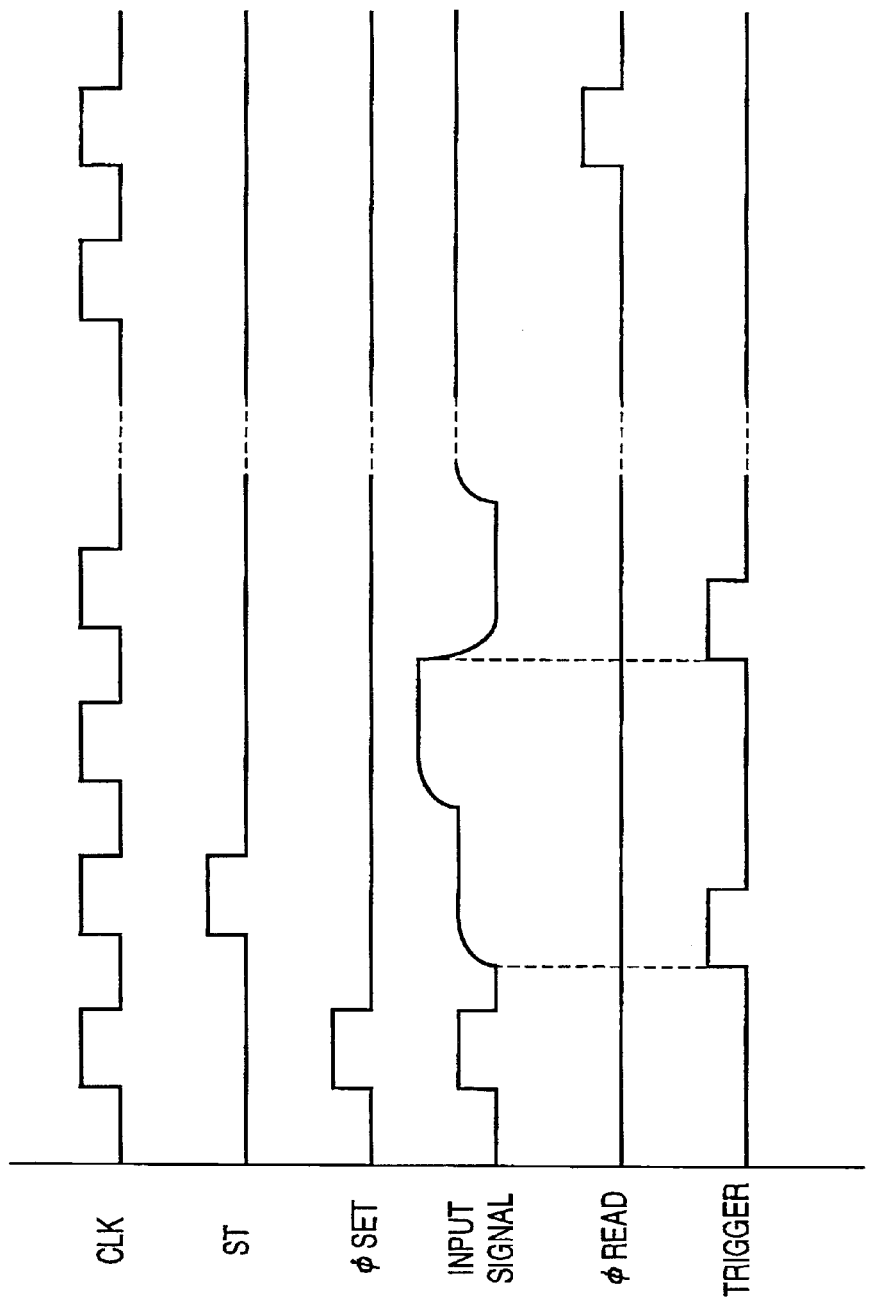
FIG. 9 is a timing chart for explaining an operation of the configuration shown in FIG. 8.

FIG. 8 is a diagram illustrating a configuration of the minimum value detector 73 used in the configuration shown in FIG. 7, and FIG. 9 is a timing chart for explaining an operation of the configuration shown in FIG. 8.

In the configuration shown in FIG. 8, N (column×row) pixel signals are serially inputted to the minimum value detector 72 through an input terminal in synchronization with a clock signal.

The output terminal of an operational amplifier 81 becomes high only when a voltage of an input signal is smaller than a voltage stored in a capacitor C (storing a minimum value), and a MOS transistor 85 for charging the capacitor C is turned on. Then, the MOS transistor 85 turns off when the input voltage and the voltage of the capacitor becomes about equal to each other.

Accordingly, the capacitor always stores the minimum value. Further, when a signal φREAD is high, the operational amplifier 81 operates as a buffer, and a minimum value is outputted from the output terminal of the operational amplifier 81. Further, when a signal φSET is high, a predetermined voltage Vset is set to the capacitor C.

A counter 82 starts counting clock pulses in response to a start pulse ST, and a latch circuit 83 latches the counter value in response to an output from the operational amplifier 81. Thus, a value held by the latch circuit 83 is rewritten whenever the output from the amplifier 81 triggers the latch circuit 83. As soon as the N-th signal is processed, the latched signal is transferred to a decoder 84, and an address of a pixel with the minimum value is outputted.

According to the first embodiment as described above, image signals are outputted from an image sensing device in a format suitable for image signal processes, thus it is possible to improve precision and processing speed of the image signal processes.

Further, speed of calculation for acquiring a luminance signal and color difference signals, maximum and minimum values, a difference between the maximum and minimum values, and addresses of pixels with the maximum and minimum values is increased since the foregoing calculation is performed on a single image sensing device; in addition, required memory capacity for the image signal processes, such as compression, which are performed subsequently is reduced.

Second Embodiment

Next, the second embodiment of the present invention is explained with reference to FIG. 10.

Figure 10:
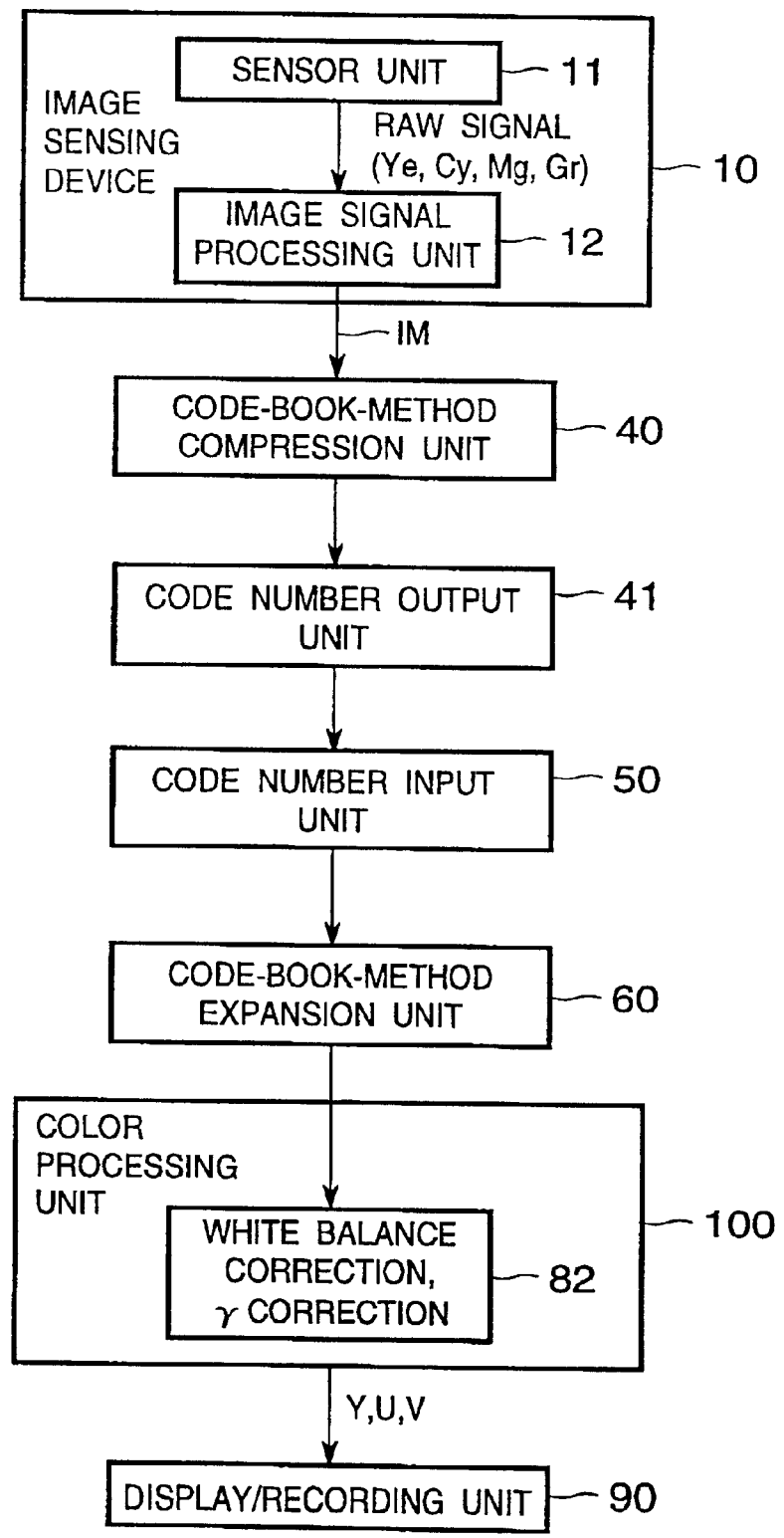
FIG. 10 is a block diagram of a configuration of an image sensing system according to a second embodiment of the present invention.

FIG. 10 is a block diagram illustrating a configuration of an image sensing system using the image sensing device 10 of the first embodiment. Referring to FIG. 10, an image sensing apparatus (transmission side) of the image sensing system comprises the image sensing device 10, the code-book-method compression unit 40, and a code number output unit 41, and a reproduction apparatus (receiving side) of the image sensing system comprises a code number input unit 50, a code-book-method expansion unit 60, a color processing unit 100 and a display/recording unit 90.

The image sensing device 10 comprises the sensor unit 11 and the image signal processing unit 12. The image sensing device 10 outputs image signals IM, including pseudo luminance signal Y' and pseudo color difference signals U' and V', maximum and minimum values, a difference between the maximum and minimum values, and addresses of pixels with the maximum and minimum values, as described above.

The image signals IM outputted from the image sensing device 10 enter the code-book-method compression unit 40. The compression unit 40 compares the image signals IM of a predetermined number of pixels inputted from the image sensing device 10 to a plurality of codes (patterns) stored in code book memory (not shown).

In the code book memory of the second embodiment, a plurality of codes having a predetermined size are stored, and the compression unit 40 searches for a code closest to the pattern of the pixel block, and the code number of the selected code is outputted. The code number outputted from the compression unit 40 is transmitted from the code number output unit 41 to the code number input unit 50 via a medium, such as a communication line.

The code number transmitted via, e.g., the communication line enters the code number input unit 50 and provided to the code-book-method expansion unit 60. The code-book-method expansion unit 60 reads a pattern (code) corresponding to the input code number from code book memory (not shown), thereby reproduces image data compressed by the code-book-method compression unit 40.

The image signals IM reproduced by the expansion unit 60 is then provided to the color processing unit 100. The color processing unit 100 has a circuit 82 for performing various necessary corrections, such as color corrections of white balance correction and γ correction, for improving quality of an image on color information of the image signals IM.

Thus, the raw signals Ye, Cy, Mg and Gr inputted from the expansion unit 60 are applied with the predetermined color processes by the color processing unit 100; as a result, a luminance signal Y and color difference signals U and V are generated and outputted.

The luminance signal Y and the color difference signals U and V outputted from the color processing unit 100 are provided to the display/recording unit 90 where displayed on a display device and/or recorded on a to recording medium.

Note, in the second embodiment, the code book method is used as information compression/expansion method, however, the present invention is not limited to this, and compression/expansion by discrete cosine transformation, quantization, variable length coding, for instance, may be performed instead.

According to the image sensing system of the second embodiment as described above, color correction processes for obtaining a high quality image are performed after the expansion process not before compression process which is a conventional sequence. Therefore, in addition to the advantages of the first embodiment, deterioration of an image due to block noise and high frequency noise caused by compression and expansion is reduced to a minimum, the amount of information to be transmitted via a communication line is greatly reduced, and deterioration of image signals, processed with color processes, due to compression/expansion is restrained; accordingly, it is possible to obtain a high quality image.

Third Embodiment

Next, the third embodiment will be explained with reference FIG. 11. In the second embodiment, the compressed signals are outputted externally via a medium, such as a communication line. In contrast, in the third embodiment, the compressed signals are temporarily recorded on a recording medium, reproduced, and applied with color processes after being expanded.

Figure 11:
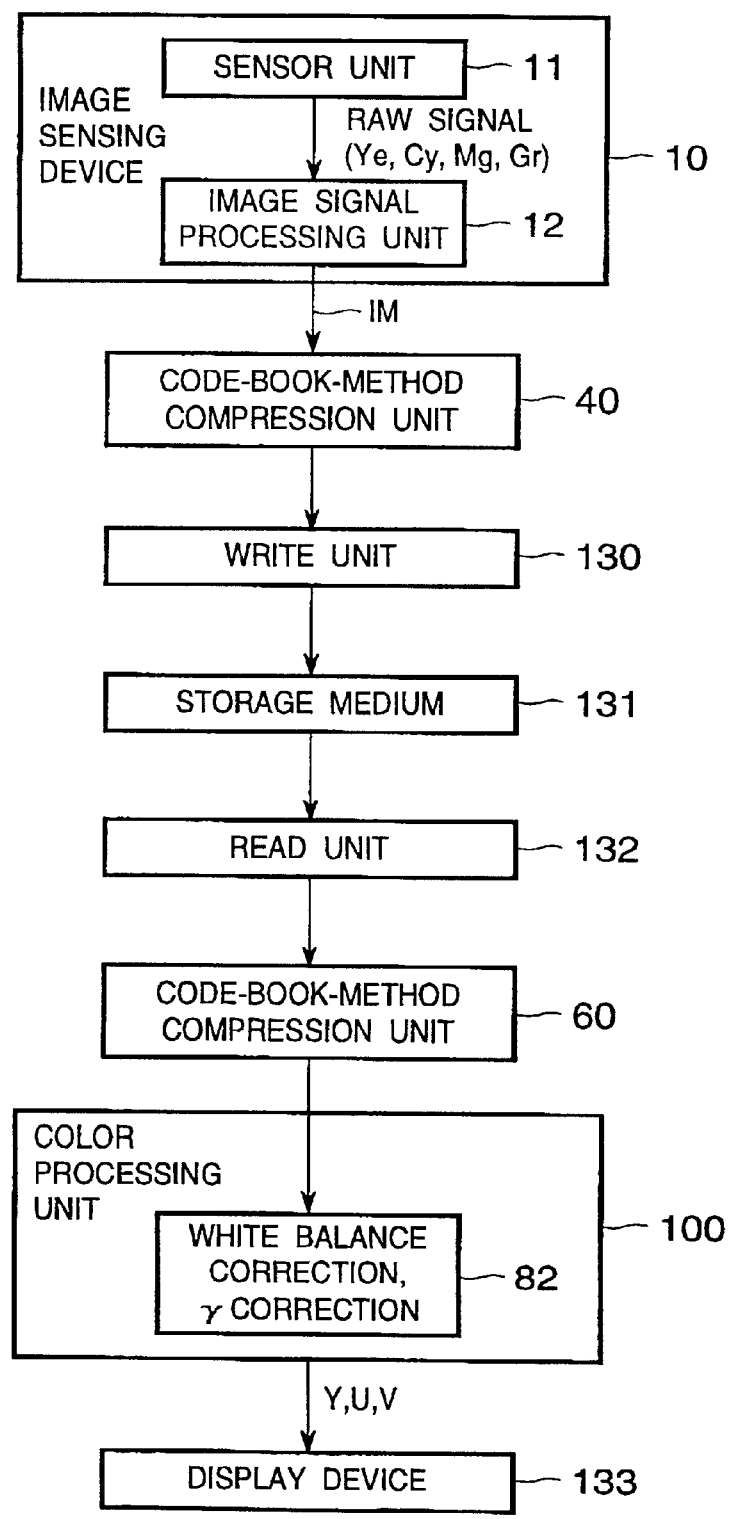
FIG. 11 is a block diagram of a configuration of an image sensing apparatus according to a third embodiment of the present invention.

The difference between FIGS. 10 and 11 is that a write unit 130, a storage medium 131, and a read unit 132 are provided between the code-book-method compression unit 40 and the code-book-method expansion unit 60.

By configuring the apparatus as described above, required capacity of internal memory is further reduced since image signals IM from the sensor unit 10 are stored in the storage medium 131. In addition, since color processes, such as white balance correction and γ correction, are performed by the color processing unit 100 after the image signals, read from the storage medium 131, are expanded by the code-book-method expansion unit 60, deterioration of an image remains low, and it is possible to display a high quality image on a display device 133.

It should be noted that the image sensing apparatus according to the third embodiment may not include the read unit 132 and its subsequent units. In this case, the read unit 132, the code-book-method expansion unit 60, the color processing unit 100, and the display/recording unit 130 may be included in a reproducing apparatus (e.g., a personal computer).

Further, the code book method is used as compression/expansion method in the third embodiment, however, the present invention is not limited to this, and compression/expansion by discrete cosine transformation, quantization, variable length coding, for instance, may be performed instead.

According to the third embodiment as described above, it is possible to achieve the similar advantages as those of the second embodiment.

Fourth Embodiment

Next, the fourth embodiment is explained.

Figure 12:
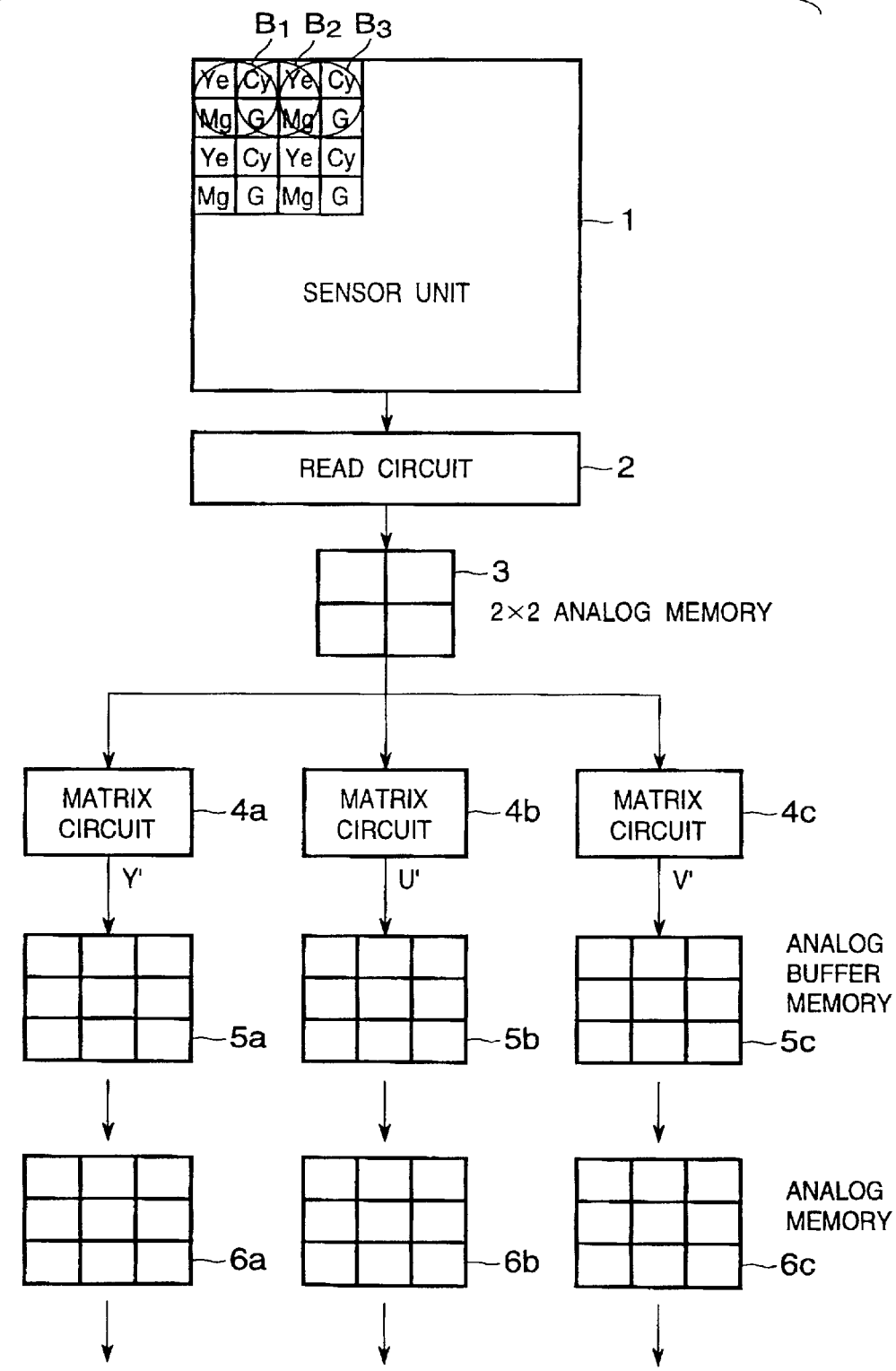
FIG. 12 is a block diagram of a part of a configuration of an image sensing device according to a fourth embodiment of the present invention.

FIG. 12 is a block diagram illustrating a part of a configuration of an image sensing device according to the fourth embodiment.

Referring to FIG. 12, processes that an optical image of an object is inputted through a color filter onto a sensor unit 1, raw image signals are outputted by a read circuit 2, and a pseudo luminance signal Y' and color difference signals U' and V' are calculated are explained.

Specifically, the image sensing device includes the sensor unit 1 having a plurality of pixels (photodiodes) for receiving light from an object through the complementary color filters, a read circuit 2 for scanning the pixels of the sensor unit 1, converting the charges of the pixels into electric signals (raw signals) of Ye, Cy, Mg, and Gr and outputting them, 2×2 analog memory 3 where signals sequentially outputted from the read circuit 2 are stored, and matrix circuits 4a to 4c for performing predetermined matrix operation on the signals stored in the memory 3, generating pseudo luminance signal Y' and pseudo color difference signals U' and V' and outputting them. The foregoing elements are formed on a single IC chip.

The units as described above operate in the following manner.

First, an optical image of an object incidents on the sensor unit 1. At this time, the optical image passes through the complementary color filters (not shown) of Ye, Cy, Mg, and Gr.

The reading circuit 2 scans the pixels of the sensor unit 1 and converts charges accumulated in the respective pixels into electric signals (raw signals). Accordingly, raw signals Ye corresponding to light passed through yellow color filters, raw signals Cy corresponding to light passed through cyan color filters, raw signals Mg corresponding to light passed through magenta color filters, and raw signals Gr corresponding to light passed through green color filters are outputted from the reading unit 2.

At this time, the reading circuit 2 scans the sensor unit 1 by four-pixel blocks of 2×2 pixel array. For instance, as shown in FIG. 12, pixels which belong to a block $B_1$ are scanned, then pixels which belong to a block $B_2$, which is shifted from the block $B_1$ by a pixel in the horizontal direction, are scanned. Thereafter, pixels which belong to a block $B_3$, which is shifted from the block $B_2$ by a pixel in the horizontal direction, are scanned, and so on.

Figures 13, 14A, 14B, 15:
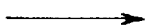
FIG. 13 is an explanatory view of raw signals read by four-pixel blocks.
FIG. 14A is an explanatory view of raw signals read by eight-pixel blocks.
FIG. 14B is an explanatory view of signals stored in 2×2 analog memory.
FIG. 15 is an explanatory view of signals stored in the 2×2 analog memory when primary color filters are used.

The reading circuit 2 obtains the raw signals Ye, Cy, Mg, and Gr by four-pixel blocks in the aforesaid manner, and the signal are stored in the 2×2 analog memory 3, as shown in FIG. 13.

The four raw signals Ye, Cy, Mg, and Gr stored in the memory 203 are outputted to the matrix circuits 4a to 4c in-parallel.

The matrix circuits 4a to 4c respectively perform matrix operation on the raw signals Ye, Cy, Mg, and Gr outputted from the memory 3 and acquire the pseudo luminance signal Y' and the pseudo color difference signals U' and V'.

More specifically, the matrix circuit 4a calculates the pseudo luminance signal Y' using, e.g., the following equation (1), $$Y'=Ye+Mg+Cy+Gr \qquad (1)$$

The matrix circuit 4b calculates the pseudo color difference signal U' using, e.g., the following equation (2), $$U'=(Ye+Mg)-(Cy+Gr) \qquad (2)$$

Further, the matrix circuit 4c calculates the pseudo color difference signal V' using, e.g., the following equation (3), $$V'=(Cy+Mg)-(Ye+Gr) \qquad (3)$$

Therefore, the pseudo luminance signal Y' and the pseudo color difference signals U' and V' obtained by the matrix circuits 4a to 4c are outputted.

It should be noted that the sensor unit 1 shown in FIG. 12 is scanned by the reading circuit 2 by four-pixel blocks (e.g., $B_1$, $B_2$, $B_3$) of 2×2 pixels and four raw signals Ye, Cy, Mg, and Gr are obtained at a time; however, the present invention is not limited to this, and it is possible to scan the image sensor unit 201 by, e.g., eight-pixel blocks of 2×4 pixels as shown in FIG. 14A to obtain raw signals of two signals of Ye, two signals of Cy, two signals of Mg, and two signals of Gr at a time.

In this case, the reading circuit 2 performs predetermined operation as shown in FIG. 14B (addition of signals of two adjoining pixels in the vertical direction, in this case), obtains four signals (Ye+Mg), (Cy+Gr), (Ye+Gr), and (Cy+Mg) from the eight raw signals read from the image sensor unit 1, and stores the four signals to the 2×2 analog memory 3. The matrix circuits 4a to 4c respectively acquire pseudo luminance signal pseudo luminance signal Y' and pseudo color difference signals U' and V' using, e.g., the aforesaid equations (1) to (3) on the basis of the four signals (Ye+Mg), (Cy+Gr), (Ye+Gr), and (Cy+Mg) stored in the memory 3.

Further, in the first embodiment, the sensor unit 1 is scanned by 2×2 pixel blocks while shifting the position of a block by a pixel, however, it is also possible to sequentially scan the sensor unit 1 by 2×2 pixel blocks so that the adjoining blocks do not overlap each other (in other words, the position of a block shifts by two pixels).

Further, in the image sensor unit 1 shown in FIG. 13, the complementary color filters are used; however, primary color filters may be used instead.

In this case, the reading circuit 2 obtains raw signals R corresponding to light passed through red color filters, raw signals G corresponding to light passed through green color filters, and raw signals B corresponding to light passed through blue color filters, and the raw signals R, G and B are stored in the memory 3 as shown in FIG. 15. Then, the matrix circuit 4a calculates the pseudo luminance signal Y' using, e.g., the following equation (4), $$Y'=R+2G+B \quad (4)$$

The matrix circuit 4b calculates the pseudo color difference signal U' using the pseudo luminance signal Y' acquired in the matrix circuit 4a and, e.g., the following equation (5), $$U'=R-Y' \quad (5)$$

Further, the matrix circuit 4c calculates the pseudo color difference signal V' using the pseudo luminance signal Y' acquired in the matrix circuit 4a and, e.g., the following equation (6), $$V'=B-Y' \quad (6)$$

The pseudo luminance signal Y' and the pseudo color difference signals U' and V' obtained in the aforesaid manner are temporarily stored in the analog buffer memories 5a to 5c, then stored in the analog memories 6a to 6c. In FIG. 12, signals are transferred by 3×3 pixel blocks; however, the present invention is not limited to this, and any block size, e.g., 4×4 pixels, is possible. Further, the reason for providing two kinds of memories, namely, the memories 5a to 5c and 6a to 6c is that, while processing signals of a given block stored in the memories 6a to 6c, signals of the next block can be stored in the memories 5a to 5c. In this manner, it is possible to increase throughput.

Figure 16:
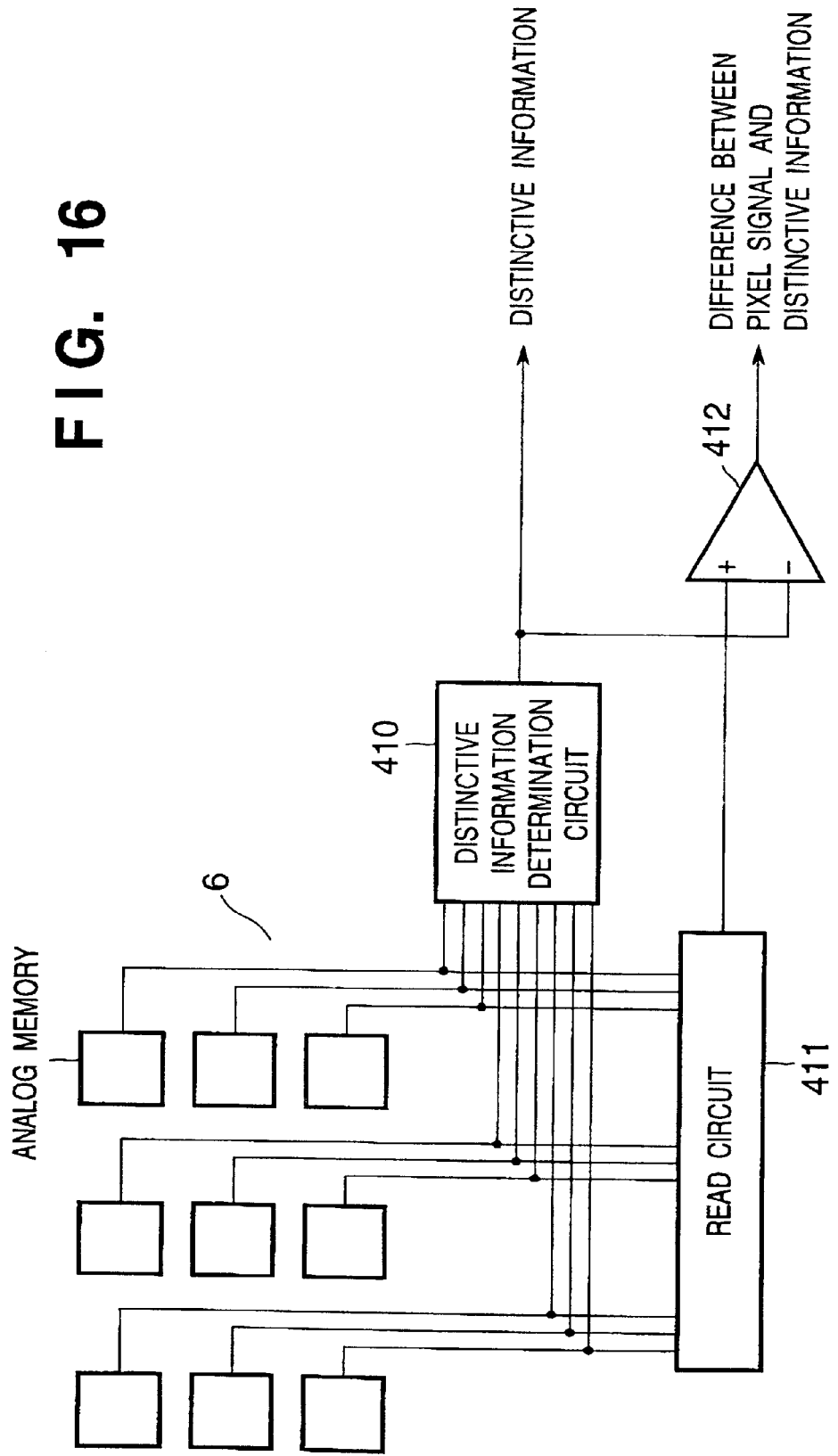
FIG. 16 is a block diagram of a configuration for obtaining distinctive information of a block and differences between the distinctive information and respective signals of the block.

FIG. 16 is a block diagram illustrating a configuration for obtaining distinctive information of each block on the basis of the signals stored in the analog memories (in the fourth embodiment, 3×3 pixels) 6a to 6c, shown in FIG. 12 capable of storing M (=column×row) signals and for obtaining differences between the distinctive information and the respective signals of the block.

The analog memory 6 shown in FIG. 16 corresponds to any one of the analog memories 6a to 6c. The M signals stored in the analog memory 6 are simultaneously transferred to a distinctive information determination circuit 410 from which distinctive information of the M signals is outputted. Further, the M signals stored in the analog memory 6 are also read out by a read circuit 411, and independently transferred to a differential amplifier 412. The differential amplifier 412 generates the difference between each of the read M signals from the read circuit 411 and the distinctive information from the distinctive information determination circuit 410.

Figure 17:
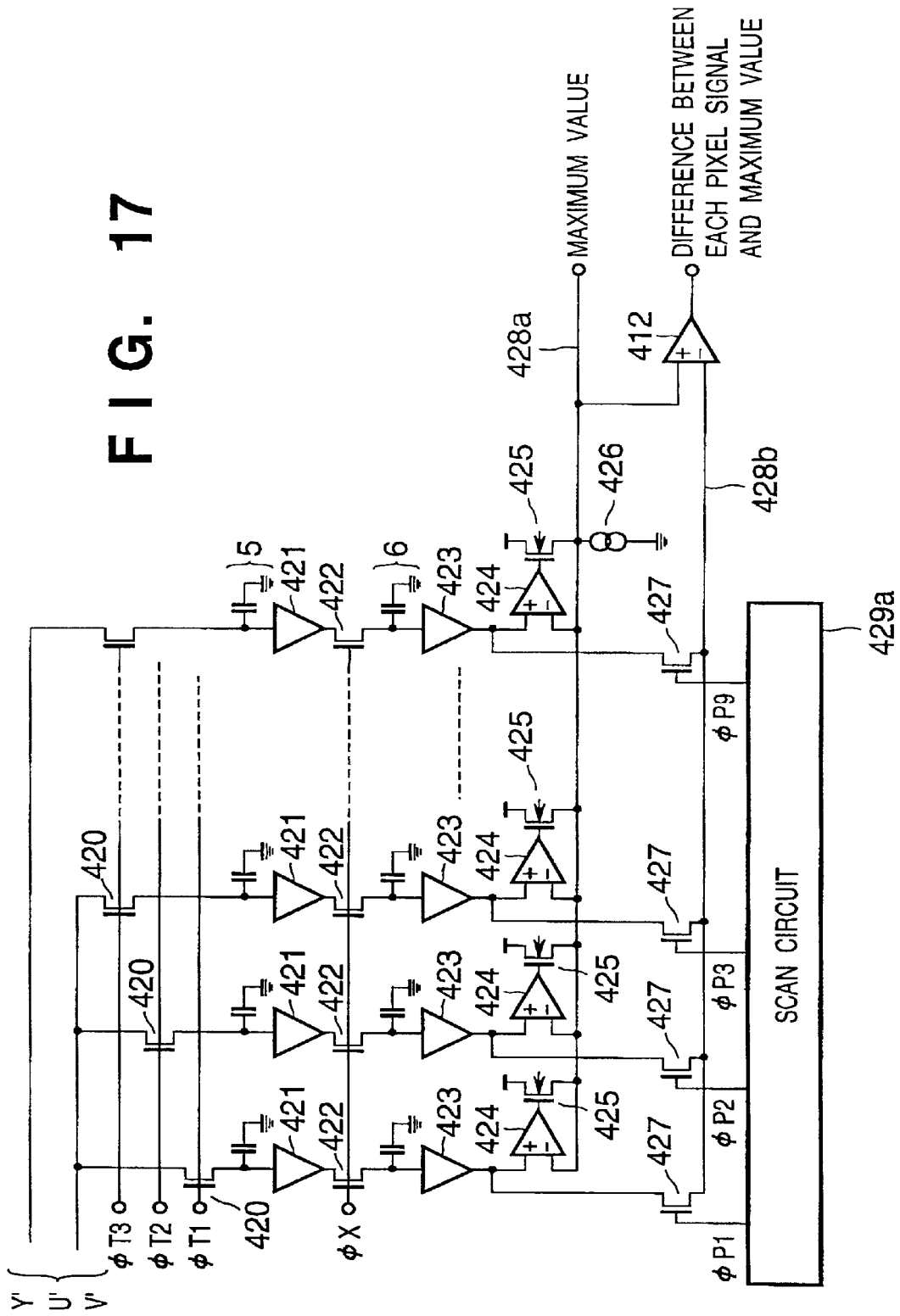
FIG. 17 is a circuit diagram of a maximum value detector according to the fourth embodiment of the present invention.

FIG. 17 is a circuit diagram illustrating a maximum value detector and a read circuit which is an example of the distinctive information determination circuit 410, and the configuration shown in FIG. 17 corresponds to units subsequent to the matrix circuits 4a to 4c in FIG. 12. Transistors 420 are for transferring either of the pseudo luminance signals Y' and the pseudo color difference signals U' and V' to the buffer memory 5, and controlled by pulse signals φT1 to φT3. The analog buffer memory 5 corresponds to any one of the buffer memories 5a to 5c in FIG. 12. Transistors 422 are for transferring signals of a block stored in the analog buffer memory 5 to the analog memory 6 via buffer circuits 421 and controlled by a pulse signal φX. The analog memory 6 corresponds to any one of the analog memories 6a to 6c shown in FIG. 12. The signals transferred and stored in the analog memory 6 enter positive terminals of respective amplifiers 424 and transistors 427 via buffer circuits 423. An output terminal of each amplifier 424 is connected to each source follower 425 and 426, and an output terminal of each source follower 425 and 426 is connected to a common output line 428a. Further, transistors 425 which configure the source followers are n type transistors. Furthermore, transistors 427 are for transferring signals stored in the analog memory 6 to another common output line 428b, and controlled by pulse signals φP1 to φP9, respectively.

Figure 18:
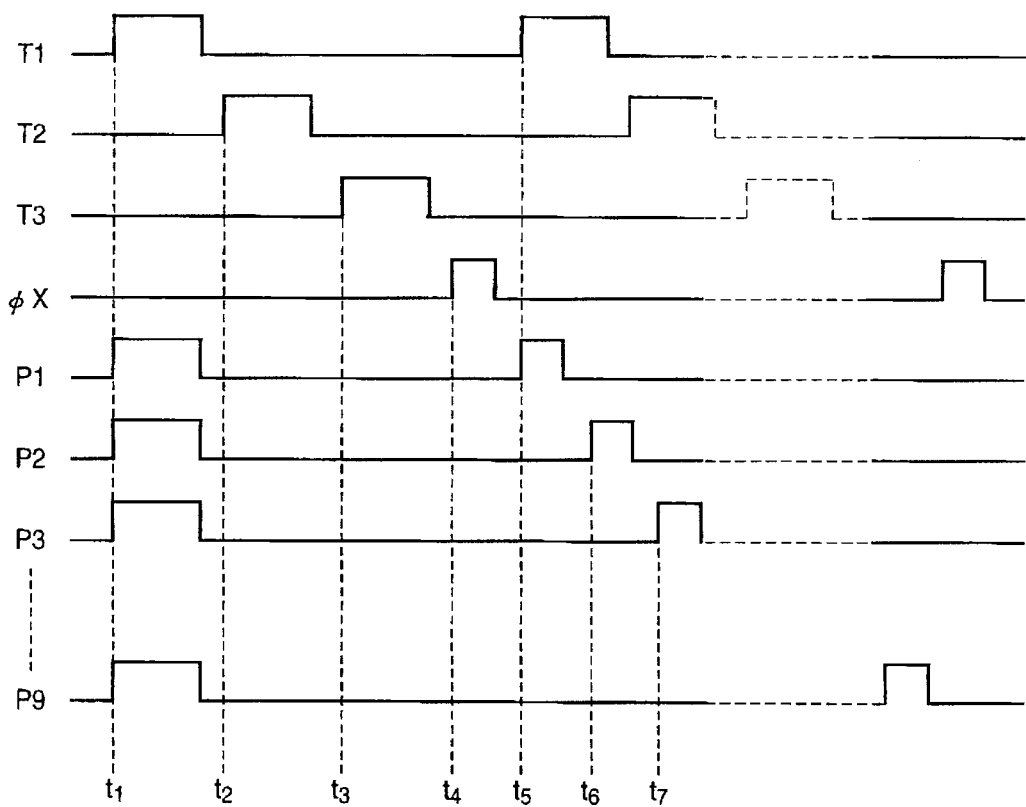
FIG. 18 is a timing chart of signals for operating the configuration shown in FIG. 17.

Next, an operation for obtaining a difference between the maximum value and each of the signals of a block is explained with reference to FIGS. 17 and 18.

First, the signal φT1 is turned to high at time t1, the signal φT2 is turned to high at time t2, and the signal φT3 is turned to high at time t3, sequentially; thereby all the pseudo luminance signals Y' and pseudo color difference signals U' and V' of a block are stored in the analog buffer memory 5. Next at time t4, the signal φX is turned to high, thereby all the signals stored in the analog buffer memory 5 are transferred to the analog memory 6. Simultaneously, a maximum value signal of the block is outputted onto the common output line 428a. Then, at time t5, the signal φP1 is turned to high, at time t6, the signal φP2 is turned to high, and so on, to sequentially turn on the transistors 427, the signals of the block are sequentially outputted onto the common output line 428b. Then, the difference between each of the outputted signals and the maximum value is obtained in the differential amplifier 412. Since the analog buffer memory 5 is provided, reading of signals from the memory 6 by a scan circuit 429a which starts at time $t_5$ and transference of signals of the next block to the analog buffer memory 5 can be performed in parallel, which improves processing speed. However, the analog buffer memory 5 is not always necessary, and may be omitted; although the processing speed is not fast as the configuration with the buffer memory 5.

According to the fourth embodiment as described above, it is possible to achieve the same advantages as those of the first embodiment.

Fifth Embodiment

Next, the fifth embodiment is explained.

Figure 19:
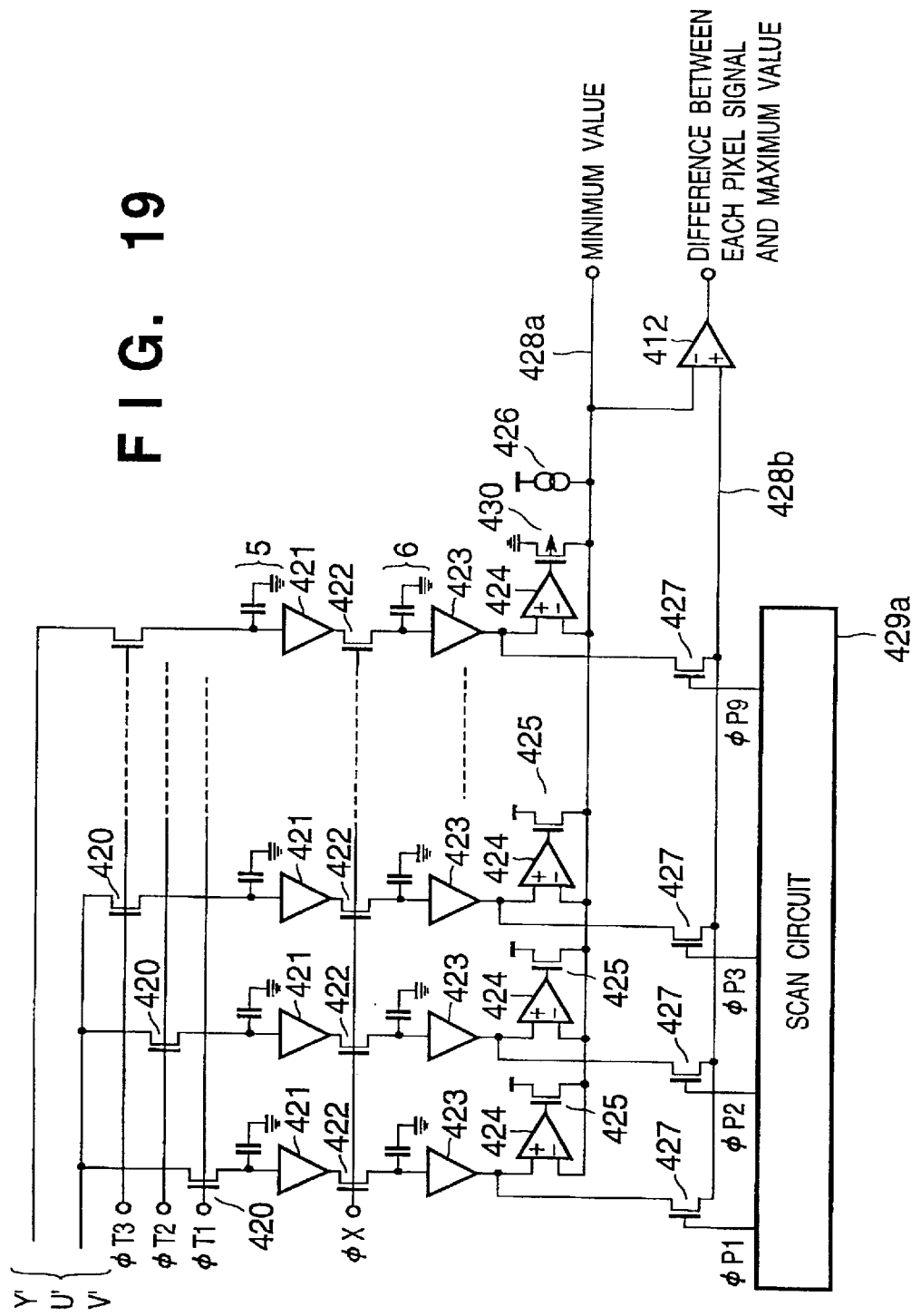
FIG. 19 is a circuit diagram of a minimum value detector according to a fifth embodiment of the present invention.

In the fifth embodiment, a minimum value detector which is an example of the distinctive information determination circuit 410, shown in FIG. 16, for determining distinctive information of a block is explained with reference to FIG. 19. The difference between the configuration shown in FIG. 17 and the configuration shown in FIG. 19 is a transistor 430 in each source follower connected to an output of each amplifier 24. An n type transistor is used in the configuration shown in FIG. 17, whereas a p type transistor is used in the configuration shown in FIG. 19. Further, different from FIG. 17, an electric power source is connected to a constant current source 426 in FIG. 19. Other units and elements are the same as those shown in FIG. 17, and a minimum value is outputted via the common output line 428a by operating the configuration shown in FIG. 19 at the same timing shown in FIG. 18.

According to the fifth embodiment as described above, it is possible to achieve the same advantages as those of the first embodiment.

Sixth Embodiment

Next, the sixth embodiment is explained.

Figure 20:
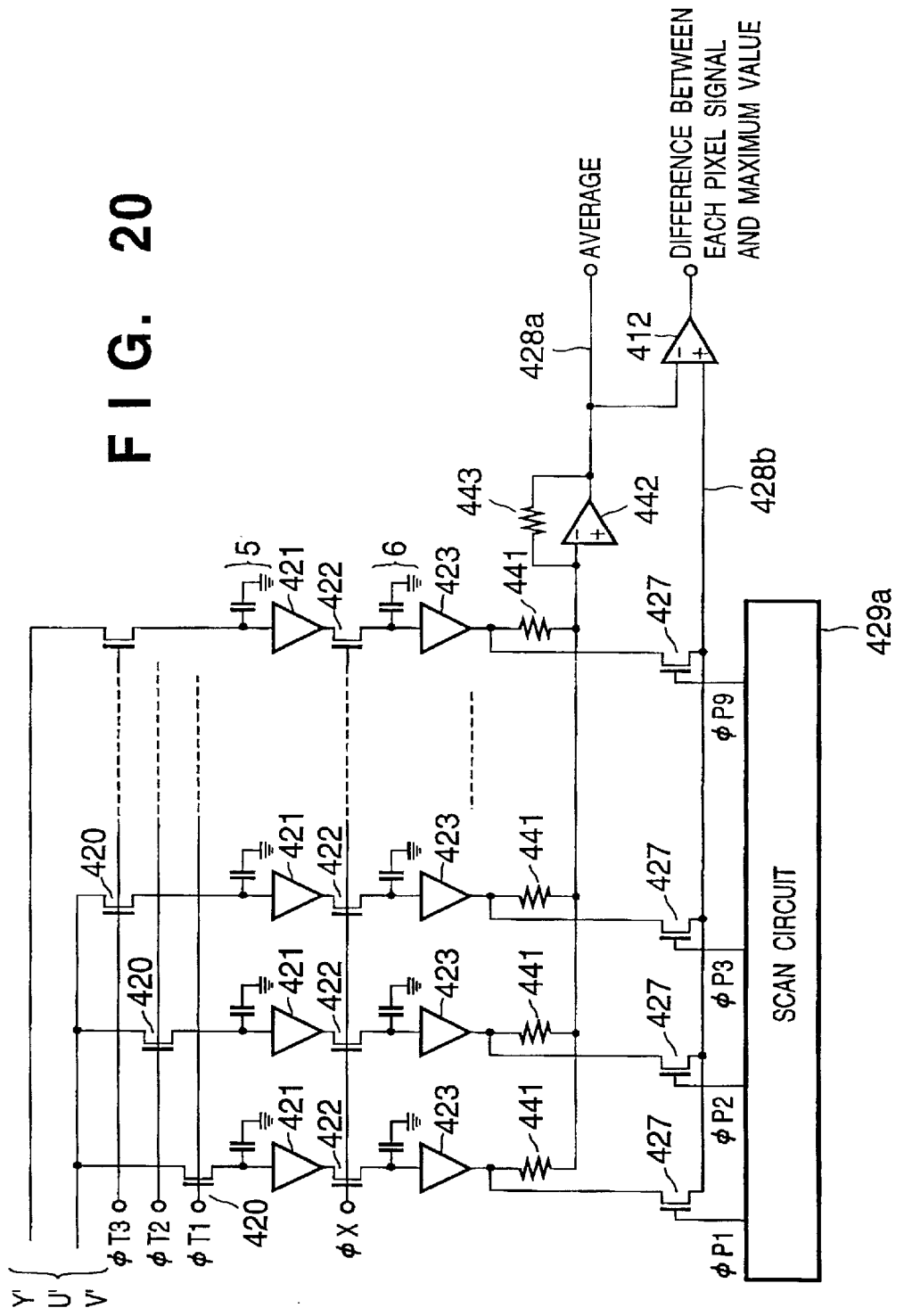
FIG. 20 is a circuit diagram of an average detection circuit according to a sixth embodiment of the present invention.

In the sixth embodiment, an average determination circuit for calculating an average is explained as an example of the distinctive information determination circuit 410, shown in FIG. 16, for determining distinctive information of a block, with reference to FIG. 20. The difference between the configuration shown in FIG. 17 and the configuration shown in FIG. 20 is that the output terminal of each amplifier 423 is connected to the common output line 428a via the amplifier 424 and the source follower 425 and 426 in FIG. 17, whereas, in FIG. 20, the output terminal of the amplifier 423 is connected to the common output line 28a via a resistor 441, and the signal from the output terminal of the amplifier 423 is amplified by an amplifier 442 and a resistor 443, then outputted. Other units and elements are the same as those shown in FIG. 17, and an average is outputted via the common output line 428a by operating the configuration shown in FIG. 20 at the same timing shown in FIG. 18.

According to the sixth embodiment as described above, it is possible to achieve the same advantages as those of the first embodiment.

Seventh Embodiment

Next, the seventh embodiment is explained.

Figure 21:
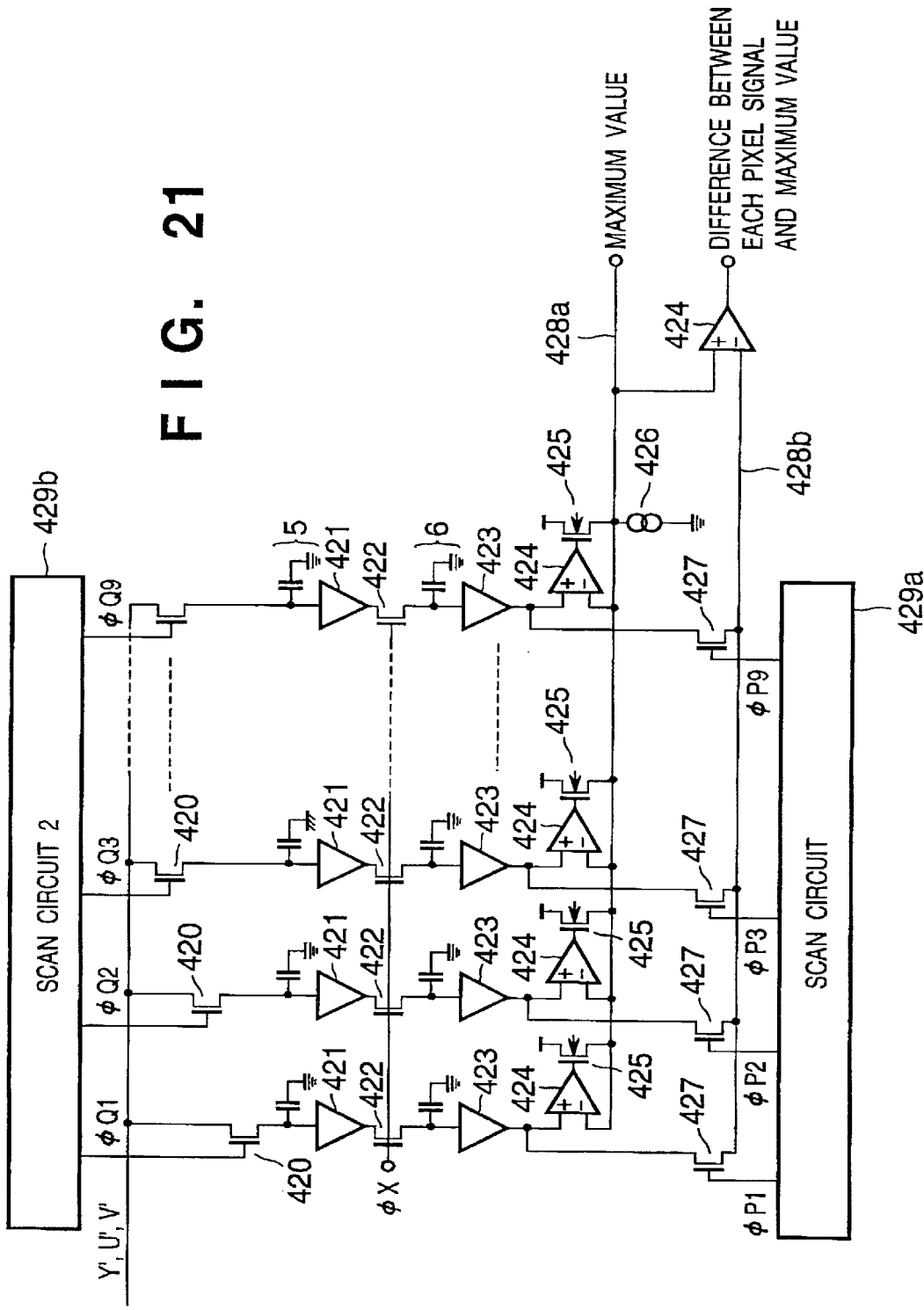
FIG. 21 is a circuit diagram of a maximum value detector according to a seventh embodiment of the present invention.

In the fourth embodiment, either the pseudo luminance signals Y', the pseudo color difference signals U', or the pseudo color difference signals V' are transferred to the transistor 420 by blocks; in contrast, either the pseudo luminance signals Y', the pseudo color difference signals U', or the pseudo color difference signals V' are inputted to the transistor 420 one by one, as shown in FIG. 21.

More specifically, by inputting pulse signals φQ1 to φQ9 sequentially to the transistors 420 from a scanning circuit 429b, the transistors 420 are sequentially tuned on. Accordingly, the pseudo luminance signals Y', the pseudo color difference signals U' and V' are inputted from the matrix circuits 4a to 4c, shown in FIG. 16, one by one. An operation of the analog buffer memory 5 and its consequent units are the same as those explained in the fourth embodiment, and a maximum value and a difference between the maximum value and each of the signals are acquired.

In the seventh embodiment as described above, a circuit for obtaining the maximum value and the difference between the maximum value and each of the signals is explained; however, it is possible to apply the configuration as described above to the fifth and sixth embodiments to obtain a minimum value and a difference between the minimum value and each of the signals, or an average and a difference between the average and each of the signals.

According to the seventh embodiment as described above, it is possible to achieve the same advantages as those of the first embodiment.

Note, in the fourth to seventh embodiments, the maximum value detector, the minimum value detector, and the average detection circuit are explained as examples of the distinctive information determination circuit 410; however the present invention is not limited to these and any circuit for acquiring information distinctive to respective blocks may be used instead.

Further, the specific information determination circuit 410 also acquires a difference between the distinctive information and each of signals of a block in the fourth to seventh embodiments; however, the present invention is not limited to a difference, and a quotient may be calculated, for example.

Furthermore, in the fourth to seventh embodiments, a pseudo luminance signal Y', a pseudo color difference signal U', and a pseudo color difference signal V' are calculated on the basis of four raw signals and stored in the analog memory 6. Therefore, the distinctive information is based on the pseudo luminance signals Y' and the pseudo color difference signals U' and V' of a block. However, raw signals from the sensor unit 1 may be used for acquiring the distinctive information. In such a case, signals from the read circuit 2 are directly stored in the analog buffer memory 5 without passing through the 2×2 analog memory 3 and the matrix circuits 4a to 4c.

Further, the 2×2 analog memory 3, the matrix circuits 4a to 4c, the analog buffer memories 5a to 5c, the analog memories 6a to 6c, the distinctive information determination circuit 410, the read circuit 411, and the differential amplifier 412 may be formed on the same chip as the sensor unit 1 and the read circuit 2, or formed on another chip.

Eighth Embodiment

Next, the eighth embodiment to which the image sensing device 310 of any of the fourth to seventh embodiments is applied is explained with reference to a block diagram shown in FIG. 22.

Figure 22:
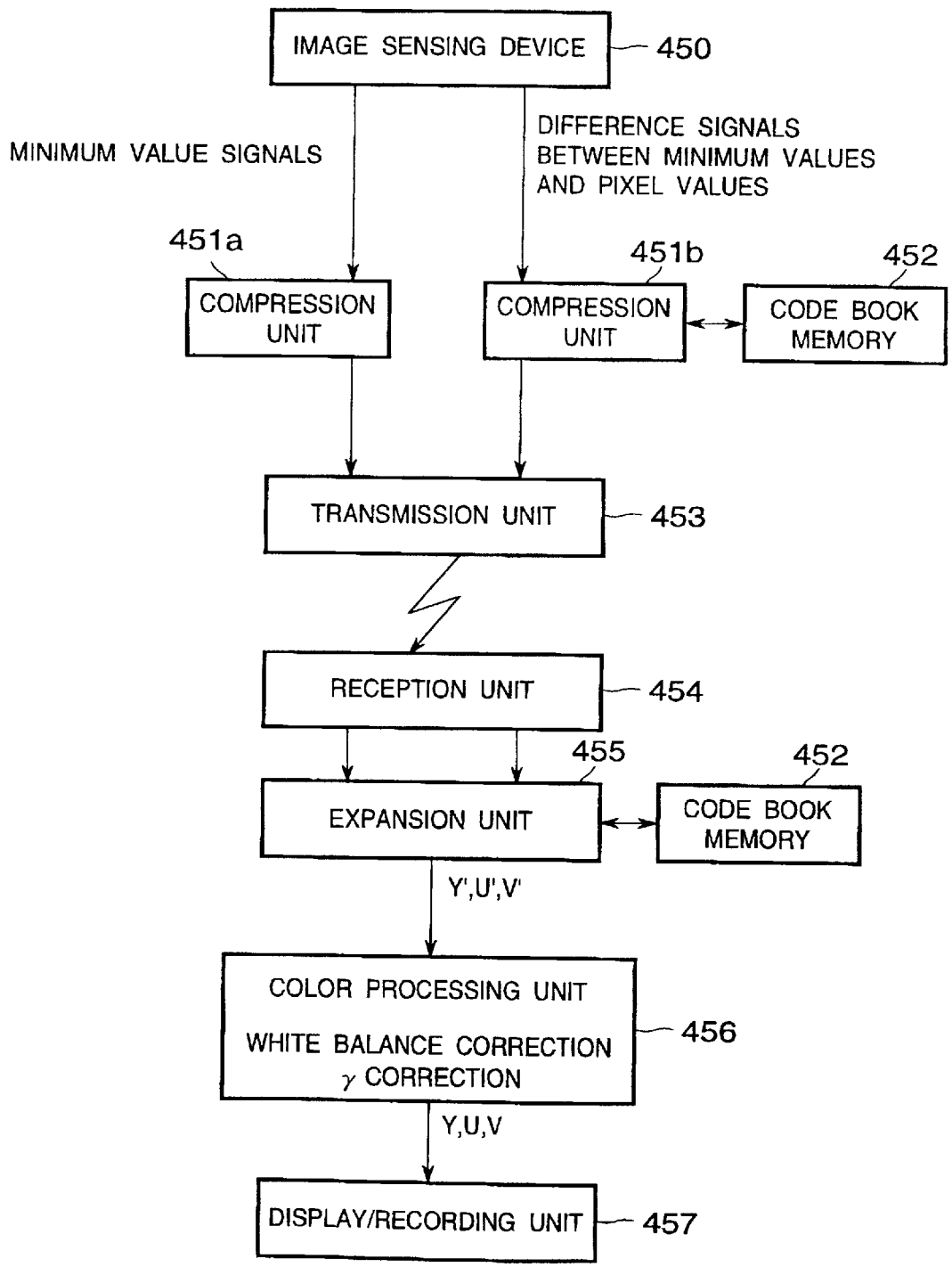
FIG. 22 is a block diagram of a configuration of an image sensing system according to an eighth embodiment of the present invention.

FIG. 22 is a block diagram illustrating a configuration of an image sensing system, which performs compression processing, using the image sensing device of the third embodiment. Referring to FIG. 22, an image sensing apparatus (transmission side) of the image sensing system comprises the image sensing device 450, a compression units 451a and 451b, code book memory 452, and a transmission unit 453, and a reproduction apparatus (receiving side) of the image sensing system comprises a reception unit 454, an expansion unit 455, a color processing unit 456 and a display/recording unit 457.

The image sensing device 450 outputs minimum value signals of pseudo luminance signals Y' and pseudo color difference signals U' and V' of a block, and difference signals between the minimum values and the respective pseudo luminance signals Y' and the pseudo color difference signals U' and V' of the block.

The compression unit 451a compresses minimum value signals of the pseudo luminance signals Y' and the pseudo color difference signals U' and V' of respective blocks and outputs compressed signals. The compression unit 451b compares an image pattern of each block represented by the difference signals to a plurality of patterns, stored in the code book memory 452 in advance, of the same size as the pattern of the block, searches the closest pattern to the pattern of the block, and outputs a code number corresponding to the searched pattern.

It should be noted that, in selecting a pattern having the same luminance, gradation, and the direction of the gradation as a pattern to be compressed from a code book, since the differences between the pixel signals and the minimum value signals of the pseudo luminance and color difference signals Y', U' and V' of the pattern to be compressed are calculated in advance, only one set of code patterns having the same gradation and the direction of the gradation is needed; accordingly, it is possible to reduce the size of the code book memory 452.

The compressed data of the minimum signals of the pseudo luminance signals Y' and the color difference signals U' and V' are transmitted via, e.g., the communication line by the transmission unit 453 and received by the reception unit 454, then provided to the expansion unit 455.

Figure 23:
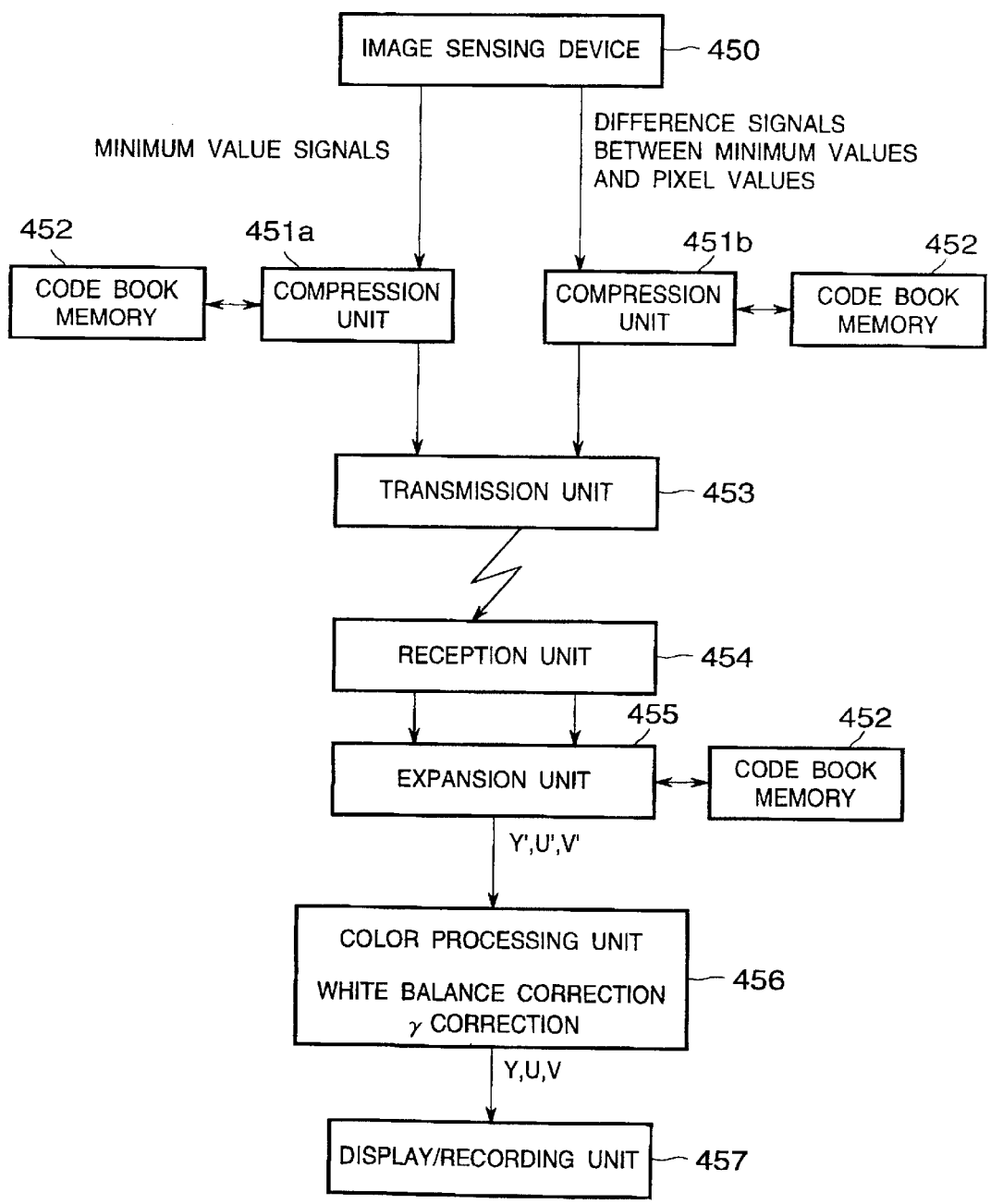
FIG. 23 is a block diagram of another configuration of the image sensing system according to the eighth embodiment of the present invention.

As shown in FIG. 22, the difference signals between the minimum values of the pseudo luminance and color difference signals (Y', U', V') and the respective pixel signals are compressed in the code book method, and the minimum value signals of the pseudo luminance and color difference signals (Y', U', V') are compressed in a different method, and transmitted by the transmission unit 453. However, the present invention is not limited to this, and it is possible to compress the minimum value signals of the pseudo luminance and color difference signals (Y', U', V') in the code book method. In this case, the pseudo luminance and color difference signals (Y', U', V') are divided by blocks of a predetermined size (e.g., 4×4 pixels), another code book memory 452 storing codes (patterns) of the predetermined size is provided in the side of the compression unit 451a as shown in FIG. 23, a pattern closest to a pattern to be compressed is searched from the code book, and a code number of the searched pattern is transmitted by the transmission unit 453.

The code books used by the compression unit 451a and 451b may be same, or may be different from each other. When the different code books are used, the corresponding two sets of code books have to be stored in the code book memory 452 for the expansion unit 455.

In the expansion unit 455, after the received code numbers are decoded using the corresponding code books, the minimum values of the pseudo luminance and color difference signals Y', U' and V' are added to the differences of the same block, and an original image is reproduced.

The color processing unit 456 performs various necessary corrections, such as color corrections of white balance correction and γ correction, for improving quality of an image on the pseudo luminance signals Y' and color difference signals U' and V' reproduced by the expansion unit 455, thereby generating luminance signals Y and color difference signals U and V. The luminance signal Y and the color difference signals U and V outputted from the color processing unit 456 are provided to the display/recording unit 457 where displayed on a display device and/or recorded on a recording medium.

Note, in the eighth embodiment, the code book method is used as information compression/expansion method, however, the present invention is not limited to this, and compression/expansion by discrete cosine transformation, quantization, variable length coding, for instance, may be performed instead.

According to the image sensing system of the eighth embodiment as described above, color correction processes for obtaining a high quality image are performed after the expansion process not before compression process which is a conventional sequence. Therefore, in addition to the advantages of the first embodiment, deterioration of an image due to block noise and high frequency noise caused by compression and expansion is reduced to a minimum, the amount of information to be transmitted via a communication line is greatly reduced, and deterioration of image signals, processed with color processes, due to compression/expansion is restrained; accordingly, it is possible to obtain a high quality image.

Note, the image sensing system described in the eighth embodiment is also applicable to the fifth to seventh embodiments.

Furthermore, by further compressing the data which has been compressed by frame, in the time direction, a moving image is also compressed.

Ninth Embodiment

Next, the ninth embodiment will be explained.

Figure 24:
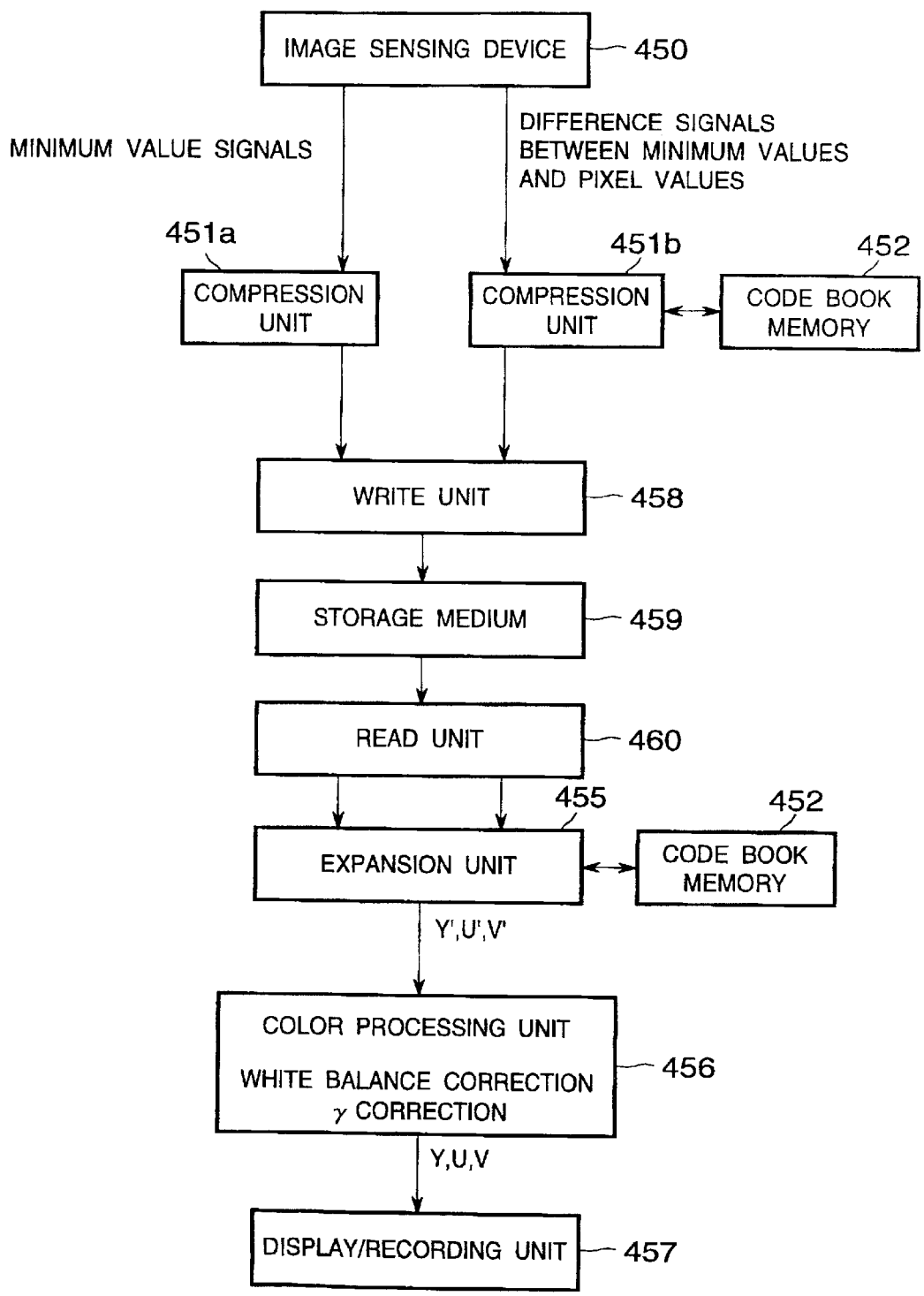
FIG. 24 is a block diagram of a configuration of an image sensing apparatus according to a ninth embodiment of the present invention.
Figure 25:
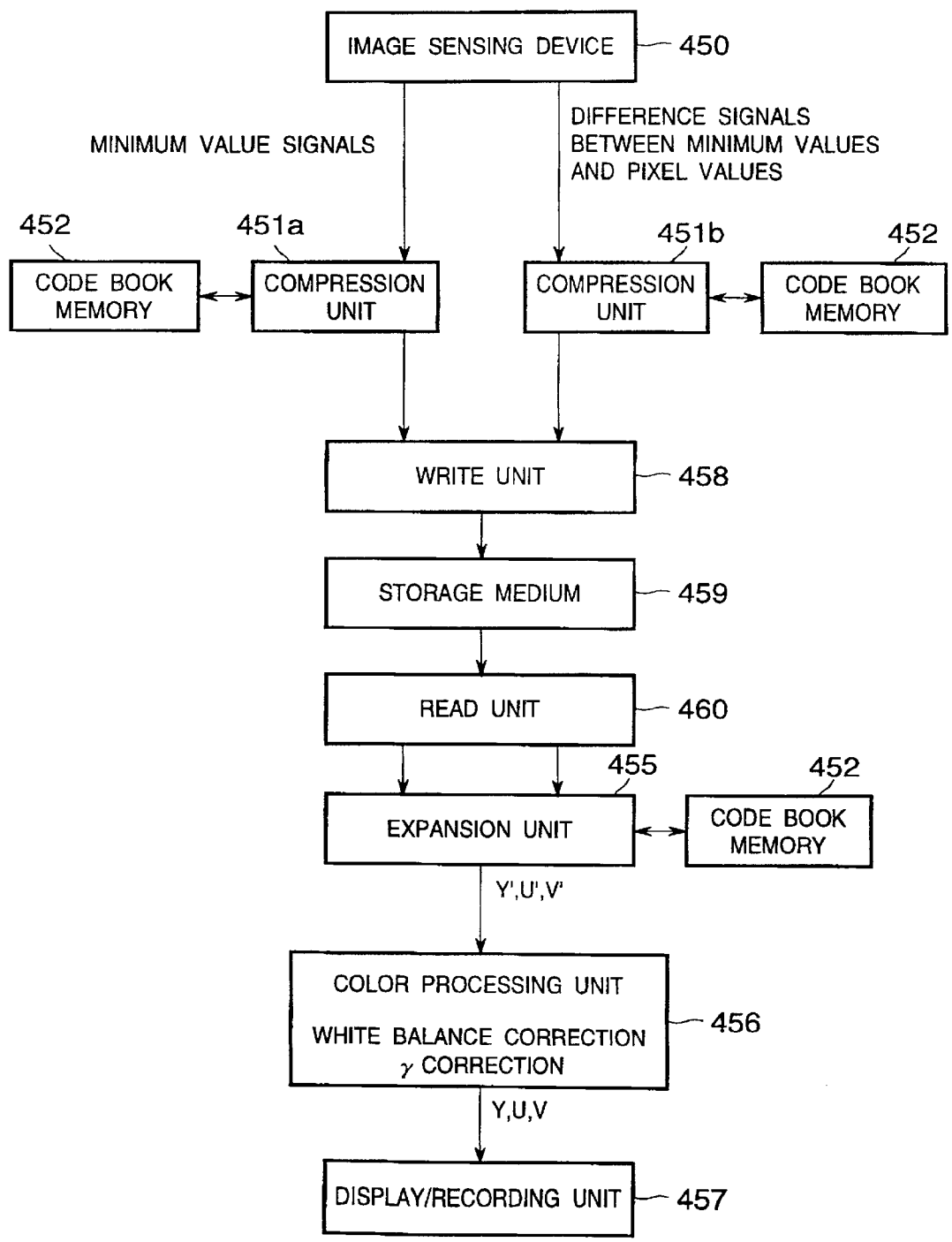
FIG. 25 is a block diagram of another configuration of the image sensing apparatus according to the ninth embodiment of the present invention.

In the eighth embodiment, the compressed signals are outputted externally via a medium, such as a communication line. In contrast, in the ninth embodiment, the compressed signals are temporarily recorded on a recording medium, reproduced, and applied with color processes after being expanded, as shown in FIGS. 24 and 25.

The differences between FIGS. 22 and 23 and FIGS. 24 and 25 are that a write unit 458, a storage medium 459, and a read unit 460 are provided between the compression units 451a and 451b and the expansion unit 455.

By configuring the apparatus as described above, required capacity of internal memory is further reduced since image signals from the sensor unit 450 are stored in the storage medium 459. In addition, since color processes, such as white balance correction and γ correction, are performed by the color processing unit 456 after the image signals, read from the storage medium 459, are expanded by the expansion unit 455, deterioration of an image remains low, and it is possible to display a high quality image on the display/recording device 457.

It should be noted that the image sensing apparatus according to the ninth embodiment may not include the read unit 458 and its subsequent units. In this case, the read unit 458, the expansion unit 455, the color processing unit 456, and the display/recording unit 457 may be included in a reproducing apparatus (e.g., a personal computer).

Further, the code book method is used as compression/expansion method in the eighth embodiment, however, the present invention is not limited to this, and compression/expansion by discrete cosine transformation, quantization, variable length coding, for instance, may be performed instead.

According to the ninth embodiment as described above, it is possible to achieve the similar advantages as those of the eighth embodiment.

Note, the image sensing system described in the eighth embodiment is also applicable to the fifth to seventh embodiments.

Furthermore, by further compressing the data has been compressed by frame in the time direction, a moving image is also compressed.

Other Embodiment

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides the aforesaid functions according to the above embodiments are realized by executing the program codes which are read by a computer, the present invention includes a case where an OS (operating system) or the like working on the computer performs a part or the entire processes in accordance with designations of the program codes and realize functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

The present invention is not limited to the above embodiments and various changes and modifications can be made within the spirit and scope of the present invention. Therefore to appraise the public of the scope of the present invention, the following claims are made.

What is claimed is:

1. An image sensing device comprising:
   a sensor unit having a plurality of pixels arranged in two dimensions, wherein said pixels are divisible into a plurality of two-dimensional pixel blocks of a first predetermined size;
   a plurality of capacitors, the number of which is less than the number of said pixels;
   a controller adapted to independently transfer signals of a said pixel block from said sensor unit to said plurality of capacitors, and to transfer the signals in said capacitors simultaneously before signals of a next pixel block are transferred to said capacitors; and
   a signal processor adapted to independently input signals of a said pixel block from said capacitors in parallel and calculate an address of a pixel with a distinctive value for each pixel block of the first predetermined size,
   wherein said sensor unit, said capacitors, said controller and said signal processor are formed on a single IC chip.

2. The image sensing device according to claim 1, wherein said distinctive value includes a maximum value of the signals for each pixel block.

3. The image sensing device according to claim 1, wherein said distinctive value includes a minimum value of the signals for each pixel block.

4. The image sensing device according to claim 3, wherein said distinctive value includes a maximum value and a minimum value of the signals for each pixel block.

5. The image sensing device according to claim 1, wherein said controller: controls a scan of said sensor unit to provide a pixel block of a second predetermined size, which is smaller than the first predetermined size, while shifting a position of the pixel block; generates pseudo luminance signals and pseudo color difference signals of the pixel blocks of the second predetermined size; and, outputs the generated pseudo luminance signals and the pseudo color difference signals for the pixel blocks of the first predetermined size.

6. The image sensing device according to claim 5, wherein said controller controls a shift in the position of the pixel block of the second predetermined size so that the two pixel blocks of the second predetermined size before and after being shifted in the horizontal or vertical direction partially overlap each other.

7. An image sensing device comprising:
   a sensor unit having a plurality of pixels arranged in two dimensions, wherein said pixels are divisible into a plurality of two-dimensional pixel blocks of a first predetermined size;
   a plurality of capacitors, the number of which is less than the number of said pixels;
   a controller adapted to independently transfer signals of a said pixel block from said sensor unit to said plurality of capacitors, and to transfer the signals in said capacitors simultaneously before signals of a next pixel block are transferred to said capacitors; and
   a signal processor adapted to independently input signals of a said pixel block from said capacitors in parallel and calculate a difference between a plurality of distinctive values for each pixel block of the predetermined size,
   wherein said plurality of distinctive values are signals of different pixels in each pixel block, and
   wherein said sensor unit, said capacitors, said controller and said signal processor are formed on a single IC chip.

8. The image sensing device according to claim 7, wherein said plurality of distinctive values include a maximum value and a minimum value of the signals for each pixel block.

9. The image sensing device according to claim 8, wherein said signal processor outputs addresses of pixels with the maximum and minimum values for each pixel block.

10. An image sensing device comprising:
    a sensor unit having a plurality of pixels arranged in two dimensions, wherein said pixels are divisible into a plurality of two-dimensional pixel blocks of a first predetermined size;
    a plurality of capacitors, the number of which is less than the number of said pixels;
    a controller adapted to independently transfer signals of a said pixel block from said sensor unit to said plurality of capacitors, and to transfer the signals in said capacitors simultaneously before signals of a next pixel block are transferred to said capacitors; and
    a signal processor adapted to independently input signals of a said pixel block from said capacitors in parallel, calculate distinctive information and perform operation between the distinctive information and each pixel in each pixel block of the first predetermined size,
    wherein said sensor unit, said capacitors, said controller and said signal processor are formed on a single IC chip.

11. The image sensing device according to claim 10, wherein said distinctive information includes a maximum value, a minimum value, or an average of the signals for each pixel block.

12. The image sensing device according to claim 10, wherein the operation performed by said signal processor includes subtraction or division.

13. The image sensing device according to claim 10, wherein said signal processor outputs the signals and the calculated distinctive information to an external signal processing apparatus, and the first predetermined size of the pixel block is set depending upon the external signal processing apparatus.

14. The image sensing device according to claim 10, wherein said controller: controls a scan of said sensor unit to provide a pixel block of a second predetermined size, which is smaller than the first predetermined size, while shifting a position of the pixel block; generates pseudo luminance signals and pseudo color difference signals of the pixel blocks of the second predetermined size; and, outputs the generated pseudo luminance signals and the pseudo color difference signals for the pixel blocks of the first predetermined size.

15. The image sensing device according to claim 14, wherein said controller controls a shift in the position of the pixel block of the second predetermined size so that the two pixel blocks of the second predetermined size before and after being shifted in the horizontal or vertical direction partially overlap each other.

16. The image sensing device according to claim 10, wherein said signal processor outputs the signals and the calculated distinctive information to an external signal processing apparatus, and the first predetermined size of the pixel block is set depending upon the external signal processing apparatus.

17. An image sensing device comprising:

a sensor unit having a plurality of pixels arranged in two dimensions, wherein said pixels are divisible into a plurality of two-dimensional pixel blocks of a first predetermined size;

a plurality of capacitors, the number of which is less than the number of said pixels;

a controller adapted to independently transfer signals of a said pixel block from said sensor unit to said plurality of capacitors, and to transfer the signals in said capacitors simultaneously before signals of a next pixel block are transferred to said capacitors; and a signal processor adapted to independently input signals of a said pixel block from said capacitors in parallel and calculate an output level of a pixel outputting a distinctive value for each pixel block of the first predetermined size, wherein said sensor unit, said capacitors, said controller and said signal processor are formed on a single IC chip.

18. The image sensing device according to claim 17, wherein said distinctive value includes at least one of maximum and minimum values of the signals for each pixel block.

\* \* \* \* \*

UNITED STATES PATENT AND TRADEMARK OFFICE
CERTIFICATE OF CORRECTION

PATENT NO. : 6,587,603 B1
DATED : July 1, 2003
INVENTOR(S) : Katsuhito Sakurai et al.

It is certified that error appears in the above-identified patent and that said Letters Patent is hereby corrected as shown below:

Title page,
Item [57], ABSTRACT,
Line 5, "an" should read -- in an --.

Column 4,
Line 67, "of-signal" should read -- of signal --.

Column 5,
Line 36, "y" should read -- γ --.

Column 6,
Line 65, "a" should read -- of a --.

Column 8,
Line 51, "to" should be deleted.

Column 9,
Line 8, "FIG. 11." should read -- to FIG. 11. --.

Column 10,
Line 29, "signal" should read -- signals --; and
Line 42, "Y'Ye+" should read -- Y'=Ye+ --.

Column 11,
Line 5, "pseudo luminance signal" should be deleted.

Column 12,
Line 54, "not" should read -- not as --.

Column 14,
Line 46, "a" should be deleted.

UNITED STATES PATENT AND TRADEMARK OFFICE
CERTIFICATE OF CORRECTION

PATENT NO.    : 6,587,603 B1
DATED         : July 1, 2003
INVENTOR(S)   : Katsuhito Sakurai et al.

It is certified that error appears in the above-identified patent and that said Letters Patent is hereby corrected as shown below:

<u>Column 17,</u>
Line 66, "controller:" should read -- controller --.

<u>Column 19,</u>
Line 11, "controller:" should read -- controller --.

Signed and Sealed this

Twenty-third Day of December, 2003

JAMES E. ROGAN
*Director of the United States Patent and Trademark Office*